United States Patent
Mannepalli et al.

(10) Patent No.: US 8,095,245 B1
(45) Date of Patent: Jan. 10, 2012

(54) THERMAL ENERGY DISPATCH SYSTEM

(75) Inventors: Rao Y. Mannepalli, Deptford, NJ (US); Paul D. Albertelli, Cherry Hill, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 268 days.

(21) Appl. No.: 12/511,622

(22) Filed: Jul. 29, 2009

(51) Int. Cl.
*G05D 3/12* (2006.01)
*G05D 5/00* (2006.01)
*G05D 9/00* (2006.01)
*G05D 11/00* (2006.01)
*G05D 17/00* (2006.01)
*G06G 7/62* (2006.01)
*G06F 17/50* (2006.01)
*G01R 11/56* (2006.01)
*G01R 21/133* (2006.01)

(52) U.S. Cl. ........ 700/291; 700/286; 700/287; 700/297; 700/298; 703/13; 703/18; 705/412

(58) Field of Classification Search ............ 703/13, 703/18; 705/412; 700/286–287, 291, 297–298
See application file for complete search history.

(56) References Cited

U.S. PATENT DOCUMENTS

| | | | | |
|---|---|---|---|---|
| 7,930,070 B2 * | 4/2011 | Imes | | 700/291 |
| 7,991,512 B2 * | 8/2011 | Chandra et al. | | 700/291 |
| 2009/0038668 A1 * | 2/2009 | Plaisted | | 136/244 |
| 2009/0093916 A1 * | 4/2009 | Parsonnet et al. | | 700/286 |
| 2011/0047052 A1 * | 2/2011 | Cornish | | 705/30 |
| 2011/0066258 A1 * | 3/2011 | Torzhkov et al. | | 700/29 |
| 2011/0166718 A1 * | 7/2011 | Van Bael et al. | | 700/287 |

OTHER PUBLICATIONS

Yiting Wang; Chasing the Sun: Concentrated Solar Power; 5 pages; printed from Internet on Aug. 19, 2011; Copright 2008.*
Energy Basics: Thermal Storage Systems for Concentrating Solar Power; 2 pages; printed from Internet on Aug. 19, 2011.*
NREL: TroughNet—Parabolic Trough Thermal energy Storage Technology; 3 pages; printed from Internet on Aug. 19, 2011.*
ScienceDirect—Solar Energy Materials and Solar Cells: Discharging simulations of a thermal energy storage system for an indirect solar cooker; 12 pages; printed from Internet on Aug. 19, 2011.*
Simulation od thermal storage systems in an integrated building simulation program; Taylor et al.; 5 pages; printed from Internet on Aug. 19, 2011.*

* cited by examiner

*Primary Examiner* — Ronald Hartman, Jr.
(74) *Attorney, Agent, or Firm* — Howard IP Law Group, PC

(57) ABSTRACT

A system and computer-implemented method for dispatching thermal energy and generating power in a solar power generating plant. The system includes a computer processor, computer readable medium, and control logic stored on the computer readable medium to direct the operation of the processor. The processor generates an optimized thermal energy dispatch schedule which controls operation of the generating plant by performing a combination of direct thermal energy and indirect thermal energy storage simulations to maximize operating revenues.

9 Claims, 16 Drawing Sheets

FIG. 4
(PRIOR ART)

TIME OF DAY PRICE ADJUSTMENT FACTORS

| HOUR | SUMMER PEAK<br>JULY, AUGUST | SHOULDER<br>MARCH, APRIL, MAY, JUNE, SEPTEMBER, OCTOBER | WINTER PEAK<br>JANUARY, FEBRUARY, NOVEMBER, DECEMBER |
|---|---|---|---|
| 1 | 0.50 | 0.50 | 0.50 |
| 2 | 0.50 | 0.50 | 0.50 |
| 3 | 0.50 | 0.50 | 0.50 |
| 4 | 0.50 | 0.50 | 0.50 |
| 5 | 0.50 | 0.50 | 0.50 |
| 6 | 0.50 | 0.50 | 0.50 |
| 7 | 0.50 | 0.50 | 1.00 |
| 8 | 1.00 | 1.00 | 1.00 |
| 9 | 1.00 | 1.00 | 1.00 |
| 10 | 1.00 | 1.00 | 1.00 |
| 11 | 1.00 | 1.00 | 1.00 |
| 12 | 1.25 | 1.00 | 1.00 |
| 13 | 1.25 | 1.00 | 1.00 |
| 14 | 1.25 | 1.00 | 1.00 |
| 15 | 1.75 | 1.00 | 1.00 |
| 16 | 1.75 | 1.00 | 1.00 |
| 17 | 1.75 | 1.00 | 1.00 |
| 18 | 1.75 | 1.00 | 1.25 |
| 19 | 1.25 | 1.00 | 1.50 |
| 20 | 1.25 | 1.00 | 1.50 |
| 21 | 1.25 | 1.00 | 1.25 |
| 22 | 1.00 | 0.75 | 0.75 |
| 23 | 1.00 | 0.75 | 0.75 |
| 24 | 0.75 | 0.75 | 0.75 |

FIG. 9

| | A | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | AVERAGE |
|---|---|---|---|---|---|---|---|---|---|---|---|---|---|---|---|---|---|---|---|---|---|---|---|---|---|---|
| 1 | | | | | | | | | | | | TIME OF DAY RELATIVE ENERGY VALUE FACTORS | | | | | | | | | | | | | | |
| 2 | | | | | | | WEEKENDS | | | | | | | | | WEEKDAYS | | | | | | | | | | |
| 3 | | | | | | | | | | | | | | | | | | | | | | | | | | |
| 4 | JAN | 0.63 | 0.62 | 0.66 | 0.74 | 0.88 | 0.99 | 1.34 | 1.32 | 1.13 | 1.17 | 1.05 | 0.98 | 0.92 | 0.89 | 0.86 | 0.92 | 1.05 | 1.35 | 1.39 | 1.36 | 1.24 | 0.98 | 0.76 | 0.66 | 1.00 |
| 5 | FEB | 0.64 | 0.64 | 0.65 | 0.78 | 0.93 | 1.00 | 1.34 | 1.32 | 1.24 | 1.17 | 1.04 | 0.98 | 0.94 | 0.91 | 0.88 | 0.91 | 1.02 | 1.31 | 1.37 | 1.33 | 1.21 | 1.00 | 0.71 | 0.67 | 1.00 |
| 6 | MAR | 0.65 | 0.64 | 0.65 | 0.78 | 0.86 | 0.94 | 1.19 | 1.15 | 1.13 | 1.11 | 1.08 | 1.05 | 1.03 | 1.01 | 1.01 | 1.04 | 1.13 | 1.23 | 1.29 | 1.26 | 1.16 | 1.05 | 0.83 | 0.69 | 1.00 |
| 7 | APR | 0.70 | 0.62 | 0.62 | 0.59 | 0.64 | 0.77 | 0.90 | 0.97 | 1.02 | 1.09 | 1.11 | 1.18 | 1.22 | 1.28 | 1.28 | 1.26 | 1.22 | 1.19 | 1.16 | 1.20 | 1.19 | 1.11 | 0.90 | 0.77 | 1.00 |
| 8 | MAY | 0.68 | 0.58 | 0.54 | 0.53 | 0.54 | 0.69 | 0.81 | 0.89 | 1.00 | 1.00 | 0.95 | 1.07 | 1.18 | 1.30 | 1.42 | 1.48 | 1.41 | 1.35 | 1.29 | 1.21 | 1.18 | 1.08 | 0.95 | 0.82 | 1.00 |
| 9 | JUN | 0.77 | 0.68 | 0.59 | 0.53 | 0.57 | 0.65 | 0.69 | 0.73 | 0.88 | 0.88 | 0.88 | 1.06 | 1.22 | 1.39 | 1.46 | 1.48 | 1.48 | 1.41 | 1.32 | 1.17 | 1.06 | 0.98 | 0.82 | 0.94 | 1.00 |
| 10 | JUL | 0.55 | 0.57 | 0.52 | 0.50 | 0.52 | 0.63 | 0.56 | 0.63 | 0.71 | 0.81 | 0.95 | 1.22 | 1.33 | 1.40 | 1.57 | 1.67 | 1.67 | 1.60 | 1.43 | 1.24 | 1.07 | 0.98 | 0.77 | 0.73 | 1.00 |
| 11 | AUG | 0.58 | 0.52 | 0.49 | 0.47 | 0.49 | 0.50 | 0.52 | 0.69 | 0.71 | 0.84 | 0.96 | 1.18 | 1.45 | 1.56 | 1.64 | 1.68 | 1.68 | 1.60 | 1.43 | 1.26 | 1.13 | 0.99 | 0.76 | 0.68 | 1.00 |
| 12 | SEP | 0.63 | 0.57 | 0.55 | 0.53 | 0.56 | 0.58 | 0.70 | 0.75 | 0.83 | 0.93 | 1.05 | 1.18 | 1.44 | 1.47 | 1.53 | 1.56 | 1.55 | 1.47 | 1.32 | 1.26 | 1.15 | 1.06 | 0.91 | 0.81 | 1.00 |
| 13 | OCT | 0.71 | 0.65 | 0.65 | 0.63 | 0.68 | 0.79 | 0.81 | 0.86 | 0.94 | 1.00 | 1.06 | 1.15 | 1.37 | 1.28 | 1.30 | 1.32 | 1.30 | 1.28 | 1.25 | 1.20 | 1.15 | 1.03 | 0.91 | 0.73 | 1.00 |
| 14 | NOV | 0.66 | 0.65 | 0.67 | 0.74 | 0.87 | 0.93 | 1.21 | 1.18 | 1.15 | 1.11 | 1.10 | 1.07 | 1.04 | 1.03 | 1.03 | 1.09 | 1.17 | 1.25 | 1.26 | 1.22 | 1.15 | 1.03 | 0.73 | 0.68 | 1.00 |
| 15 | DEC | 0.61 | 0.60 | 0.63 | 0.71 | 0.82 | 0.84 | 1.33 | 1.28 | 1.24 | 1.18 | 1.05 | 0.98 | 0.93 | 0.91 | 0.90 | 0.97 | 1.12 | 1.40 | 1.44 | 1.39 | 1.27 | 1.06 | 0.71 | 0.62 | 1.00 |

TOD EV FACTORS

WEEKENDS

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | AVERAGE |
|---|---|---|---|---|---|---|---|---|---|---|---|---|---|---|---|---|---|---|---|---|---|---|---|---|---|
| JAN | 0.63 | 0.62 | 0.66 | 0.74 | 0.88 | 0.99 | 1.34 | 1.32 | 1.26 | 1.17 | 1.05 | 0.98 | 0.92 | 0.89 | 0.86 | 0.92 | 1.05 | 1.35 | 1.39 | 1.36 | 1.24 | 0.98 | 0.76 | 0.66 | 1.00 |
| FEB | 0.64 | 0.64 | 0.65 | 0.78 | 0.93 | 1.00 | 1.34 | 1.32 | 1.24 | 1.17 | 1.04 | 0.98 | 0.94 | 0.91 | 0.88 | 0.91 | 1.02 | 1.31 | 1.37 | 1.33 | 1.21 | 1.00 | 0.71 | 0.67 | 1.00 |
| MAR | 0.65 | 0.64 | 0.65 | 0.78 | 0.86 | 0.94 | 1.19 | 1.15 | 1.13 | 1.11 | 1.08 | 1.06 | 1.03 | 1.01 | 1.01 | 1.04 | 1.13 | 1.23 | 1.29 | 1.26 | 1.16 | 1.05 | 0.83 | 0.69 | 1.00 |
| APR | 0.70 | 0.62 | 0.62 | 0.59 | 0.64 | 0.77 | 0.90 | 0.97 | 1.02 | 1.09 | 1.13 | 1.18 | 1.22 | 1.28 | 1.28 | 1.26 | 1.22 | 1.19 | 1.16 | 1.20 | 1.19 | 1.11 | 0.90 | 0.77 | 1.00 |
| MAY | 0.68 | 0.58 | 0.54 | 0.53 | 0.54 | 0.62 | 0.69 | 0.81 | 0.89 | 1.00 | 1.11 | 1.18 | 1.30 | 1.39 | 1.42 | 1.42 | 1.41 | 1.35 | 1.29 | 1.21 | 1.18 | 1.08 | 0.95 | 0.82 | 1.00 |
| JUN | 0.77 | 0.68 | 0.60 | 0.54 | 0.57 | 0.64 | 0.59 | 0.65 | 0.73 | 0.88 | 1.06 | 1.22 | 1.33 | 1.40 | 1.46 | 1.48 | 1.48 | 1.41 | 1.32 | 1.17 | 1.06 | 0.96 | 1.05 | 0.94 | 1.00 |
| JUL | 0.65 | 0.57 | 0.53 | 0.50 | 0.50 | 0.52 | 0.56 | 0.63 | 0.71 | 0.81 | 0.95 | 1.21 | 1.45 | 1.57 | 1.64 | 1.67 | 1.67 | 1.60 | 1.43 | 1.24 | 1.06 | 0.98 | 0.82 | 0.73 | 1.00 |
| AUG | 0.58 | 0.52 | 0.49 | 0.47 | 0.49 | 0.50 | 0.64 | 0.69 | 0.75 | 0.84 | 0.96 | 1.18 | 1.44 | 1.56 | 1.64 | 1.68 | 1.68 | 1.60 | 1.43 | 1.28 | 1.07 | 0.99 | 0.77 | 0.68 | 1.00 |
| SEP | 0.63 | 0.57 | 0.55 | 0.53 | 0.56 | 0.58 | 0.71 | 0.75 | 0.83 | 0.93 | 1.05 | 1.18 | 1.37 | 1.47 | 1.53 | 1.56 | 1.55 | 1.47 | 1.32 | 1.26 | 1.13 | 1.01 | 0.76 | 0.69 | 1.00 |
| OCT | 0.71 | 0.65 | 0.63 | 0.63 | 0.68 | 0.79 | 0.81 | 0.86 | 0.94 | 1.00 | 1.06 | 1.15 | 1.23 | 1.28 | 1.30 | 1.32 | 1.30 | 1.28 | 1.25 | 1.20 | 1.15 | 1.06 | 0.91 | 0.81 | 1.00 |
| NOV | 0.66 | 0.65 | 0.67 | 0.74 | 0.87 | 0.83 | 1.21 | 1.18 | 1.15 | 1.11 | 1.10 | 1.07 | 1.04 | 1.03 | 1.03 | 1.09 | 1.17 | 1.26 | 1.25 | 1.22 | 1.15 | 1.03 | 0.73 | 0.68 | 1.00 |
| DEC | 0.61 | 0.60 | 0.63 | 0.71 | 0.82 | 0.84 | 1.33 | 1.28 | 1.24 | 1.18 | 1.05 | 0.98 | 0.93 | 0.91 | 0.90 | 0.97 | 1.12 | 1.40 | 1.44 | 1.39 | 1.27 | 1.06 | 0.71 | 0.62 | 1.00 |

FIG. 12B

24 HR WINDOW

CREATABLE LOG FILE NAME =/RAO-IP/DISPATCH/TMP/LOG-24.TXT
CREATABLE RESULTS FILE NAME = /RAO-IP/DISPATCH/TMP/RESULTS-24. CSV
ENERGY REQUIRED TO PB (NORMAL HR)             = 732
ENERGY REQUIRED TO PB (STARTUP HR)            = 879
ENERGY IN TES REQUIRED TO PB (NORMAL HR)      = 796
ENERGY IN TES REQUIRED TO PB (STARTUP HR)     = 955
ENERGY REQUIRED IN SF TO PB (NORMAL HR)       = 796
ENERGY REQUIRED IN SF TO PB (STARTUP HR)      = 955
DETAILS FORDISPATCH:
    EXPERIMENT ID              = RAO-DISPATCH-12-23-2008-DIRECT-CASE-1
    TOD FILE NAME              = /RAO-IP/DISPATCH/TOD.TXT
    SAM COL-33 FILE NAME       = /RAO-IP/DISPATCH/APS-1998.TXT
    RESULTS FILE NAME          = /RAO-IP/DISPATCH/TMP/RESULTS.CSV
    LOG FILE NAME              = /RAO-IP/DISPATCH/TMP/LOG.TXT
    NAME PLATE RATING (MW)     = 290.0
    STEAM CYCLE EFFICIENCY     = 0.396
    TURBINE STARTUP ENERGY (MW) = 146.465
    OIL TO SALT EX. EFF        = 0.92
    SALT TO STEAM EC. EFF      = 0.92
    OIL TO STEAM EX.EFF        = 0.92
    TES RETENTION EFF          = 1.0
    WINDOW SIZE (HR)           = 24
    OVERLAP (HR)               = 0
    INITAL ENERGY IN TES (MWh) = 0.0
    TES SIZE LIMIT (MWh)       = 9.99999999E8
TES BEFORE = 0
ADDITIONAL TES DUE TO INDIRECT (NWh) = 0

*FIG. 13*

Direct Storage: startHr=4345 window = 24

| Index | hour# | TOD | TOD-scale | SF-TE | energyUs | GenThisHs | startpHr | elecGener | revenue | SF2PB | SF2TES | TES2PB | TES(D) | TesDelta |
|---|---|---|---|---|---|---|---|---|---|---|---|---|---|---|
| 0 | 4345 | 0.65 | 476 | 0 | 0 | 0 | 0 | 0 | 0 | 0 | 0 | 0 | 0 | 0 |
| 1 | 4346 | 0.57 | 417 | 0 | 0 | 0 | 0 | 0 | 0 | 0 | 0 | 0 | 0 | 0 |
| 2 | 4347 | 0.53 | 388 | 0 | 0 | 0 | 0 | 0 | 0 | 0 | 0 | 0 | 0 | 0 |
| 3 | 4348 | 0.5 | 366 | 0 | 0 | 0 | 0 | 0 | 0 | 0 | 0 | 0 | 0 | 0 |
| 4 | 4349 | 0.5 | 366 | 0 | 0 | 0 | 0 | 0 | 0 | 0 | 0 | 0 | 0 | 0 |
| 5 | 4350 | 0.52 | 381 | 0 | 0 | 0 | 0 | 0 | 0 | 0 | 0 | 0 | 0 | 0 |
| 6 | 4351 | 0.56 | 410 | 0 | 0 | 0 | 0 | 0 | 0 | 0 | 0 | 0 | 0 | 0 |
| 7 | 4352 | 0.63 | 461 | 845 | 0 | 0 | 0 | 0 | 0 | 0 | 845 | 0 | 777 | 0 |
| 8 | 4353 | 0.71 | 520 | 1130 | 0 | 0 | 0 | 0 | 0 | 0 | 1130 | 0 | 1817 | 0 |
| 9 | 4354 | 0.81 | 593 | 1190 | 0 | 0 | 0 | 0 | 0 | 0 | 1190 | 0 | 2912 | 0 |
| 10 | 4355 | 0.95 | 696 | 1200 | 879 | 1 | 1 | 290 | 275.5 | 0 | 1200 | 955 | 3061 | 0 |
| 11 | 4356 | 1.2 | 886 | 1200 | 732 | 1 | 0 | 290 | 350.9 | 0 | 1200 | 796 | 3369 | 0 |
| 12 | 4357 | 1.45 | 1062 | 1150 | 732 | 1 | 0 | 290 | 420.5 | 0 | 1150 | 796 | 3631 | 0 |
| 13 | 4358 | 1.57 | 1150 | 1170 | 732 | 1 | 0 | 290 | 455.3 | 0 | 1170 | 796 | 3911 | 0 |
| 14 | 4359 | 1.64 | 1201 | 947 | 732 | 1 | 0 | 290 | 475.6 | 0 | 947 | 796 | 3986 | 0 |
| 15 | 4360 | 1.67 | 1223 | 1050 | 732 | 1 | 0 | 290 | 484.3 | 0 | 1060 | 796 | 4155 | 0 |
| 16 | 4361 | 1.67 | 1223 | 911 | 732 | 1 | 0 | 290 | 484.3 | 0 | 911 | 796 | 4208 | 0 |
| 17 | 4362 | 1.6 | 1172 | 841 | 732 | 1 | 0 | 290 | 464 | 0 | 841 | 796 | 4185 | 0 |
| 18 | 4363 | 1.43 | 1047 | 362 | 732 | 1 | 0 | 290 | 414.7 | 0 | 362 | 796 | 3722 | 0 |
| 19 | 4364 | 1.24 | 908 | 0 | 732 | 1 | 0 | 290 | 359.6 | 0 | 0 | 796 | 2926 | 0 |
| 20 | 4365 | 1.07 | 784 | 0 | 732 | 1 | 0 | 290 | 310.3 | 0 | 0 | 796 | 2130 | 0 |
| 21 | 4366 | 0.98 | 718 | 0 | 732 | 1 | 0 | 290 | 284.2 | 0 | 0 | 796 | 1334 | 0 |
| 22 | 4367 | 0.82 | 601 | 0 | 732 | 1 | 0 | 290 | 237.8 | 0 | 0 | 796 | 538 | 0 |
| 23 | 4368 | 0.73 | 535 | 0 | 0 | 0 | 0 | 0 | 0 | 0 | 0 | 0 | 538 | 0 |
| | | | | 12006 | 9667 | 13 | | 3770 | 5017 | | | | 4208 | |

Indirect Storage: startHr=4345 window = 24

| Index | hour# | TOD | TOD-scale | SF-TE | energyUs | GenThisHs | startpHr | elecGener | revenue | SF2PB | SF2TES | TES2PB | TES(I) | TesDelta |
|---|---|---|---|---|---|---|---|---|---|---|---|---|---|---|
| 0 | 4345 | 0.65 | 476 | 0 | 0 | 0 | 0 | 0 | 0 | 0 | 0 | 0 | 0 | 0 |
| 1 | 4346 | 0.57 | 417 | 0 | 0 | 0 | 0 | 0 | 0 | 0 | 0 | 0 | 0 | 0 |
| 2 | 4347 | 0.53 | 388 | 0 | 0 | 0 | 0 | 0 | 0 | 0 | 0 | 0 | 0 | 0 |
| 3 | 4348 | 0.5 | 366 | 0 | 0 | 0 | 0 | 0 | 0 | 0 | 0 | 0 | 0 | 0 |
| 4 | 4349 | 0.5 | 366 | 0 | 0 | 0 | 0 | 0 | 0 | 0 | 0 | 0 | 0 | 0 |
| 5 | 4350 | 0.52 | 381 | 0 | 0 | 0 | 0 | 0 | 0 | 0 | 0 | 0 | 0 | 0 |
| 6 | 4351 | 0.56 | 410 | 0 | 0 | 0 | 0 | 0 | 0 | 0 | 0 | 0 | 0 | 0 |
| 7 | 4352 | 0.63 | 461 | 845 | 0 | 0 | 0 | 0 | 0 | 0 | 845 | 0 | 777 | 0 |
| 8 | 4353 | 0.71 | 520 | 1130 | 0 | 0 | 0 | 0 | 0 | 0 | 1180 | 0 | 1817 | 0 |
| 9 | 4354 | 0.81 | 593 | 1190 | 0 | 0 | 0 | 0 | 0 | 0 | 1190 | 0 | 2912 | 0 |
| 10 | 4355 | 0.95 | 696 | 1200 | 879 | 1 | 1 | 290 | 275.5 | 955 | 245 | 0 | 3157 | 96 |
| 11 | 4356 | 1.21 | 886 | 1200 | 732 | 1 | 0 | 290 | 350.9 | 796 | 404 | 0 | 3561 | 96 |
| 12 | 4357 | 1.45 | 1062 | 1150 | 732 | 1 | 0 | 290 | 420.5 | 796 | 354 | 0 | 3915 | 92 |
| 13 | 4358 | 1.57 | 1150 | 1170 | 732 | 1 | 0 | 290 | 455.3 | 796 | 374 | 0 | 4289 | 94 |
| 14 | 4359 | 1.64 | 1201 | 947 | 732 | 1 | 0 | 290 | 475.6 | 796 | 151 | 0 | 4440 | 76 |
| 15 | 4360 | 1.67 | 1223 | 1060 | 732 | 1 | 0 | 290 | 484.3 | 796 | 264 | 0 | 4704 | 85 |
| 16 | 4361 | 1.67 | 1223 | 911 | 732 | 1 | 0 | 290 | 484.3 | 796 | 115 | 0 | 4819 | 73 |
| 17 | 4362 | 1.6 | 1172 | 841 | 732 | 1 | 0 | 290 | 464 | 796 | 45 | 0 | 4864 | 67 |
| 18 | 4363 | 1.43 | 1047 | 362 | 732 | 1 | 0 | 290 | 414.7 | 362 | 0 | 434 | 4430 | 29 |
| 19 | 4364 | 1.24 | 908 | 0 | 732 | 1 | 0 | 290 | 359.6 | 0 | 0 | 796 | 3634 | 0 |
| 20 | 4365 | 1.07 | 784 | 0 | 732 | 1 | 0 | 290 | 310.3 | 0 | 0 | 796 | 2838 | 0 |
| 21 | 4366 | 0.98 | 718 | 0 | 732 | 1 | 0 | 290 | 284.2 | 0 | 0 | 796 | 2042 | 0 |
| 22 | 4367 | 0.82 | 601 | 0 | 732 | 1 | 0 | 290 | 237.8 | 0 | 0 | 796 | 1246 | 0 |
| 23 | 4368 | 0.73 | 535 | 0 | 0 | 0 | 0 | 0 | 0 | 0 | 0 | 0 | 1246 | 0 |
| | | | | 12006 | 9667 | 13 | | 3770 | 5017 | | | | 4864 | |

FIG. 14

2nd Pass
Direct Storage: startHr=4345 window = 24

| Index | hour# | TOD | TOD-scale | SF-TE | energyUsGenThisHs | startpHr | elecGener | revenue | SF2PB | SF2TES | TES2PB | TES(D) | TesDelta |
|---|---|---|---|---|---|---|---|---|---|---|---|---|---|
| 0 | 4345 | 0.65 | 476 | 0 | 0 | 0 | 0 | 0 | 0 | 0 | 0 | 0 | 0 |
| 1 | 4346 | 0.57 | 417 | 0 | 0 | 0 | 0 | 0 | 0 | 0 | 0 | 0 | 0 |
| 2 | 4347 | 0.53 | 388 | 0 | 0 | 0 | 0 | 0 | 0 | 0 | 0 | 0 | 0 |
| 3 | 4348 | 0.5 | 366 | 0 | 0 | 0 | 0 | 0 | 0 | 0 | 0 | 0 | 0 |
| 4 | 4349 | 0.5 | 366 | 0 | 0 | 0 | 0 | 0 | 0 | 0 | 0 | 0 | 0 |
| 5 | 4350 | 0.52 | 381 | 0 | 0 | 0 | 0 | 0 | 0 | 0 | 0 | 0 | 0 |
| 6 | 4351 | 0.56 | 410 | 0 | 0 | 0 | 0 | 0 | 0 | 0 | 0 | 0 | 0 |
| 7 | 4352 | 0.63 | 461 | 845 | 0 | 0 | 0 | 0 | 0 | 845 | 0 | 777 | 0 |
| 8 | 4353 | 0.71 | 520 | 1130 | 0 | 0 | 0 | 0 | 0 | 1130 | 0 | 1817 | 0 |
| 9 | 4354 | 0.81 | 593 | 1190 | 879 | 1 | 0 | 290 | 234.9 | 0 | 1190 | 955 | 1957 | 0 |
| 10 | 4355 | 0.95 | 696 | 1200 | 732 | 1 | 1 | 290 | 275.5 | 0 | 1200 | 796 | 2361 | 96 |
| 11 | 4356 | 1.21 | 886 | 1200 | 732 | 1 | 0 | 290 | 350.9 | 0 | 1200 | 796 | 2765 | 96 |
| 12 | 4357 | 1.45 | 1062 | 1150 | 732 | 1 | 0 | 290 | 420.5 | 0 | 1150 | 796 | 3119 | 92 |
| 13 | 4358 | 1.57 | 1150 | 1170 | 732 | 1 | 0 | 290 | 455.3 | 0 | 1170 | 796 | 3493 | 94 |
| 14 | 4359 | 1.64 | 1201 | 947 | 732 | 1 | 0 | 290 | 475.6 | 0 | 947 | 796 | 3644 | 76 |
| 15 | 4360 | 1.67 | 1223 | 1050 | 732 | 1 | 0 | 290 | 484.3 | 0 | 1060 | 796 | 3908 | 85 |
| 16 | 4361 | 1.67 | 1223 | 911 | 732 | 1 | 0 | 290 | 484.3 | 0 | 911 | 796 | 4023 | 73 |
| 17 | 4362 | 1.6 | 1172 | 841 | 732 | 1 | 0 | 290 | 464 | 0 | 841 | 796 | 4068 | 67 |
| 18 | 4363 | 1.43 | 1047 | 362 | 732 | 1 | 0 | 290 | 414.7 | 0 | 362 | 796 | 3634 | 29 |
| 19 | 4364 | 1.24 | 908 | 0 | 732 | 1 | 0 | 290 | 359.6 | 0 | 0 | 796 | 2838 | 0 |
| 20 | 4365 | 1.07 | 784 | 0 | 732 | 1 | 0 | 290 | 310.3 | 0 | 0 | 796 | 2042 | 0 |
| 21 | 4366 | 0.98 | 718 | 0 | 732 | 1 | 0 | 290 | 284.2 | 0 | 0 | 796 | 1246 | 0 |
| 22 | 4367 | 0.82 | 601 | 0 | 732 | 1 | 0 | 290 | 237.8 | 0 | 0 | 796 | 450 | 0 |
| 23 | 4368 | 0.73 | 535 | 0 | 0 | 0 | 0 | 0 | 0 | 0 | 0 | 0 | 450 | 0 |
|  |  |  |  | 12006 | 10399 | 14 |  | 4060 | 5251.9 |  |  |  | 4068 |  |

2nd Pass
Indirect Storage: startHr=4345 window = 24

| Index | hour# | TOD | TOD-scale | SF-TE | energyUsGenThisHs | startpHr | elecGener | revenue | SF2PB | SF2TES | TES2PB | TES(I) | TesDelta |
|---|---|---|---|---|---|---|---|---|---|---|---|---|---|
| 0 | 4345 | 0.65 | 476 | 0 | 0 | 0 | 0 | 0 | 0 | 0 | 0 | 0 | 0 |
| 1 | 4346 | 0.57 | 417 | 0 | 0 | 0 | 0 | 0 | 0 | 0 | 0 | 0 | 0 |
| 2 | 4347 | 0.53 | 388 | 0 | 0 | 0 | 0 | 0 | 0 | 0 | 0 | 0 | 0 |
| 3 | 4348 | 0.5 | 366 | 0 | 0 | 0 | 0 | 0 | 0 | 0 | 0 | 0 | 0 |
| 4 | 4349 | 0.5 | 366 | 0 | 0 | 0 | 0 | 0 | 0 | 0 | 0 | 0 | 0 |
| 5 | 4350 | 0.52 | 381 | 0 | 0 | 0 | 0 | 0 | 0 | 0 | 0 | 0 | 0 |
| 6 | 4351 | 0.56 | 410 | 0 | 0 | 0 | 0 | 0 | 0 | 0 | 0 | 0 | 0 |
| 7 | 4352 | 0.63 | 461 | 845 | 0 | 0 | 0 | 0 | 0 | 845 | 0 | 777 | 0 |
| 8 | 4353 | 0.71 | 520 | 1130 | 0 | 0 | 0 | 0 | 0 | 1130 | 0 | 1817 | 0 |
| 9 | 4354 | 0.81 | 593 | 1190 | 879 | 1 | 1 | 290 | 234.9 | 955 | 235 | 0 | 1957 | 95 |
| 10 | 4355 | 0.95 | 696 | 1200 | 732 | 1 | 0 | 290 | 275.5 | 796 | 404 | 0 | 2361 | 96 |
| 11 | 4356 | 1.21 | 886 | 1200 | 732 | 1 | 0 | 290 | 350.9 | 796 | 404 | 0 | 2765 | 96 |
| 12 | 4357 | 1.45 | 1062 | 1150 | 732 | 1 | 0 | 290 | 420.5 | 796 | 354 | 0 | 3119 | 92 |
| 13 | 4358 | 1.57 | 1150 | 1170 | 732 | 1 | 0 | 290 | 455.3 | 796 | 374 | 0 | 3493 | 94 |
| 14 | 4359 | 1.64 | 1201 | 947 | 732 | 1 | 0 | 290 | 475.6 | 796 | 151 | 0 | 3644 | 76 |
| 15 | 4360 | 1.67 | 1223 | 1060 | 732 | 1 | 0 | 290 | 484.3 | 796 | 264 | 0 | 3908 | 85 |
| 16 | 4361 | 1.67 | 1223 | 911 | 732 | 1 | 0 | 290 | 484.3 | 796 | 115 | 0 | 4023 | 73 |
| 17 | 4362 | 1.6 | 1172 | 841 | 732 | 1 | 0 | 290 | 464 | 796 | 45 | 0 | 4068 | 67 |
| 18 | 4363 | 1.43 | 1047 | 362 | 732 | 1 | 0 | 290 | 414.7 | 362 | 0 | 434 | 3634 | 29 |
| 19 | 4364 | 1.24 | 908 | 0 | 732 | 1 | 0 | 290 | 359.6 | 0 | 0 | 796 | 2838 | 0 |
| 20 | 4365 | 1.07 | 784 | 0 | 732 | 1 | 0 | 290 | 310.3 | 0 | 0 | 796 | 2042 | 0 |
| 21 | 4366 | 0.98 | 718 | 0 | 732 | 1 | 0 | 290 | 284.2 | 0 | 0 | 796 | 1246 | 0 |
| 22 | 4367 | 0.82 | 601 | 0 | 732 | 1 | 0 | 290 | 237.8 | 0 | 0 | 796 | 450 | 0 |
| 23 | 4368 | 0.73 | 535 | 0 | 0 | 0 | 0 | 0 | 0 | 0 | 0 | 0 | 450 | 0 |
|  |  |  |  | 12006 | 10399 | 14 |  | 4060 | 5251.9 |  |  |  | 4068 |  |

FIG. 15

THERMAL ENERGY DISPATCH SYSTEM

FIELD OF INVENTION

The present invention relates to solar thermal energy systems, and more particularly to a system and method for scheduling thermal energy dispatch and power generation in a solar power generating plant.

BACKGROUND OF THE INVENTION

Solar thermal energy systems represent a technology for capturing renewable radiant energy from the sun and converting that energy into thermal energy that can be used to generate electricity. Concentrating solar power (CSP) is a technology that offers electric utility scale power production. CSP systems include collectors such as mirrors or reflectors (sometimes referred to as heliostats or concentrators) that are arrayed in a solar collector field ("solar field" or "SF") which capture and in turn concentrate sunlight onto a thermal receiver. The thermal receiver contains a heat transfer fluid such as oil or molten salt (typically a mixture of 60% sodium nitrate and 40% potassium nitrate) that is heated to a temperature sufficient to produce steam via a combination of conventional fluid-to-steam heat exchangers. The steam is used to drive a conventional steam turbine-generator set ("power block" or "PB") which produces electricity that may be sold to a power grid operated by a an electric power distribution company or utility for delivery to its customers over a conventional power transmission network. Some present CSP system designs include parabolic trough systems, parabolic dish systems, and power tower systems that employ a plurality of reflectors which focus the solar energy onto a thermal receiver positioned atop a centrally-located tower.

Thermal energy storage (TES) is an integral part of CSP systems for capturing and storing as much solar thermal energy as possible when available to compensate for periods of time when sunlight is not available due to either weather conditions or time of day. TES basically employs an insulated hot storage tank and a pumping and piping system with suitable flow control valves which may temporarily store the heated heat transfer fluid or medium until needed to produce steam for generating electricity via the power block. In some systems, a combination of oil and molten salt may be used as the heat transfer fluids coupled with a combination of oil-to-salt and/or oil or salt-to-steam heat exchangers. In other systems, a single heat transfer fluid may be used. The heat exchangers are not 100% efficient; therefore, there will be thermal energy losses incurred when heat is exchanged. A typical heat exchanger efficiency without limitation is about 92% as an illustration. Accordingly, the net amount of thermal energy that may be either stored in TES or transferred to the power block will be less than the thermal energy produced by solar collector field.

Two types of TES systems are generally employed—direct storage and indirect storage TES. In direct TES, as shown in FIG. 1, a serial pumping and piping arrangement are used in the CSP system 15 between the solar collector field 10, thermal energy storage 12 which may comprise one or more conventional insulated storage tanks, and power block 14. Both the solar collector field 10 and thermal energy storage 12 may have one or more associated pumps that cause the heat transfer fluid or medium to flow in the desired direction through flow conduits 18A-B (and 18C shown in FIG. 2 discussed below). Whenever the solar collector field 10 generates thermal energy, it is sent to the TES. If the TES is full, the energy is dumped or wasted. When there is a demand to produce electric power, thermal energy is drawn from the TES storage tank to produce steam and drive the turbine-generator set of the power block. The embodiment shown employing dual heat transfer fluids requires both an oil-to-salt heat exchangers 11 and a salt-to-steam heat exchanger 13.

For indirect TES, as shown in FIG. 2, parallel pumping and piping arrangements are used in the CSP system 16 between the solar collector field 10, thermal storage 12, and power block 14. Therefore, thermal energy may be routed whenever generated by solar collector field directly to the power block 14 (an via oil-to-steam heat exchanger 17) and/or to the TES (via oil-to-salt heat exchanger 11) depending on whether there is a demand to produce electric power and/or the amount of thermal energy needed to produce sufficient steam to drive the turbine-generator set of the power block. The power block may draw thermal energy from both TES (via salt-to-steam heat exchanger 13) and directly from the solar collector field if needed.

Both direct and indirect TES have advantages and disadvantages. The overall efficiency of indirect TES is higher than direct storage (generally about 8% more in some instances) because two heat exchanges are not always involved in the thermal energy flow between the solar collector field and power block as shown in FIG. 2. The efficiency of direct TES is therefore inherently lower because two heat exchangers are always used in the system as shown in FIG. 1. However, direct TES has a simpler control system and is generally easier to optimize and schedule its operation. Optimization is more difficult with indirect TES because of its flexible operation since scheduling when to dispatch of thermal energy from the heated TES tank to the power block depends on the hours selected for electricity generation. In direct TES, by contrast, thermal energy must always pass through and be drawn from the heated storage tank whenever there is a demand to produce steam for generating electricity. Accordingly, indirect TES requires a more complex control system than direct TES.

Accordingly, an apparatus and method for better optimizing operation of CSP systems with indirect TES is desired to take advantage of its higher efficiencies in contrast to direct TES.

SUMMARY OF INVENTION

A system and computer-implemented method are provided for optimizing the thermal energy dispatch and power generation in a CSP generating plant. The system generally includes a computer processor, computer readable medium, and program instructions or control logic stored on the computer readable medium to direct the operation of the processor. The processor generates an optimized thermal energy dispatch schedule which controls operation of the generating plant by iteratively performing a combination of direct thermal energy and indirect thermal energy storage simulations to maximize operating revenues, as further described herein.

BRIEF DESCRIPTION OF THE DRAWINGS

The features of the preferred embodiments will be described with reference to the following drawings where like elements are labeled similarly, and in which:

FIG. 4 is a chart of prior art qualitative time of use (TOU) data used dispatch thermal energy in a TES generating plant;

FIG. 9 is a chart showing time of day (TOD) relative energy value factors (price adjustment factors);

FIG. 12 is a chart showing TOD relative energy value factors for the graph of FIG. 11 in tabular form;

FIG. 13 is a chart showing exemplary operating information and data usable in the routine of FIG. 5;

FIG. 14 is a chart showing exemplary results for a first pass from the direct and indirect TES simulations from the routines of FIGS. 7 and 8, respectively, for dispatching thermal energy in a TES generating plant;

FIG. 15 is a chart showing exemplary results for a second pass from the direct and indirect TES simulations from the routines of FIGS. 7 and 8, respectively, for dispatching thermal energy in a TES generating plant.

DETAILED DESCRIPTION OF THE INVENTION

Figure 1:
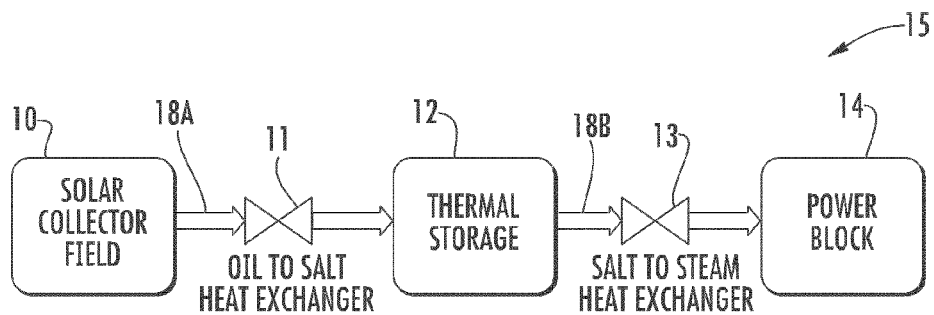
FIG. 1 is a diagram of a direct thermal energy store (TES) system.

In the description of embodiments of the invention disclosed herein, any reference to direction or orientation is merely intended for convenience of description and is not intended in any way to limit the scope of the present invention. Moreover, the features and benefits of the invention are illustrated by reference to preferred embodiments. Accordingly, the invention expressly should not be limited to such preferred embodiments illustrating some possible but non-limiting combination of features that may be provided alone or in other combinations of features; the scope of the invention being defined by the claims appended hereto.

The decision when to store the energy in the TES, when to send it directly to the power block (PB), and when to draw the energy from TES is loosely termed herein as the "Dispatch of Thermal Energy" or simply "Dispatch". The cumulative results of the foregoing energy routing over a period of time or operating window is termed herein "Dispatch Schedule."

By nature, the thermal energy from a solar field is available only for a part of the day. Generally, the service assurance agreements between the solar power generator and electric utility dictate that the designer of CSP plant guarantees certain parameters. They foremost include, but not limited to, total annual electric power production (measured in megawatts of energy or MWh). Hence, CSP plants generally are designed with a solar multiple (SM) of greater than 1.0 and thermal energy storage (TES) to allow the plant to generate power even during inclement weather and at night. SM is basically the ratio of the thermal capacity of the collector field to the thermal energy requirements of the steam turbine-generator set. The excess thermal energy delivered by the solar collector field (SCF) is therefore stored in TES and used to generate electricity even when the sun is not shining.

The decision when to store the thermal energy in the TES, when to send the energy directly to the power block (PB), and when to draw the energy from TES is loosely termed as the "Dispatch of Thermal Energy" or simply "Dispatch."

More often than not, electricity users or customers of the utility purchasing power are charged a variable rate for the electricity. This is based on the season (typically monthly), day of the week (weekday or weekend) and the hour of the day. For example, in many instances, periods of peak electric demand often fall during the early morning or evening hours. And depending on where the utility is located, winter and/or summer may be seasons of peak demand commanding higher electric rates due to high HVAC loads whereas spring or fall may be lower.

Figure 4:
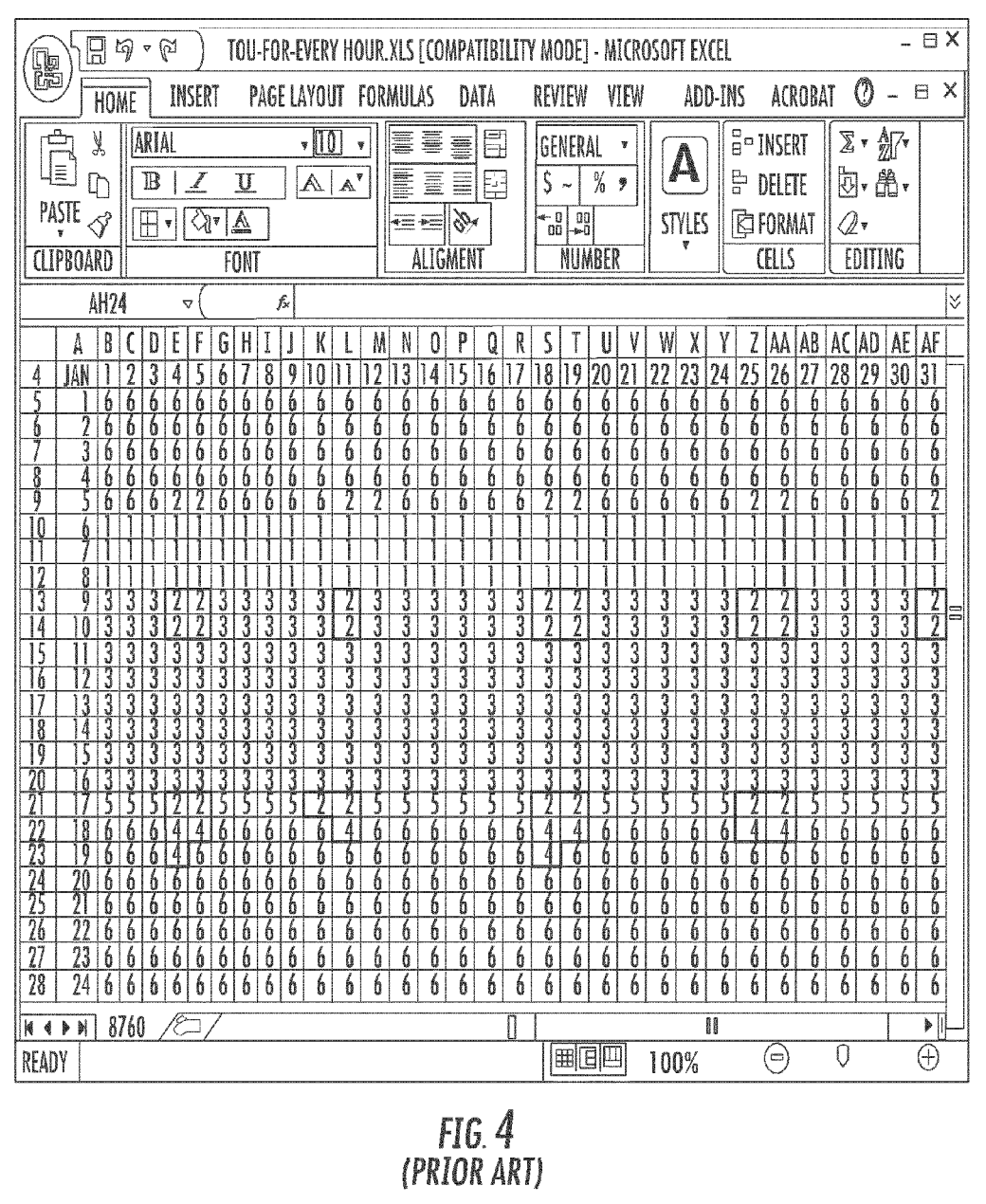

Generally, a qualitative term referred to as "time of use" (TOU) has been used heretofore to represent the variability in electricity rates and periods of demand. TOU is a discrete number graded on a scale of 1 to 10, with 1 representing the most profitable period to dispatch thermal energy and generate power and 10 relatively being the least profitable. Representative average monthly TOU data for a hypothetical month of January is shown in FIG. 4. This TOU data was used heretofore to determine thermal energy dispatch and power generation scheduling priorities with the implicit assumption being that dispatch should meet the requirements of TOU=1 first, then 2, 3, and so on.

Thermal energy dispatch and power generation scheduling decisions and optimizations of the past that have been based on TOU lack the mathematical precision required to make a fully informed decisions required to fine tune and optimize revenues for the CSP generating plants. This is particularly applicable to CSP with indirect TES which has the operational flexibility described herein to use thermal energy directly generate power and/or store the energy in TES for later use. Although TOU describes relative revenues and priorities for power generation and dispatch of thermal energy, TOU is not a quantitative revenue metric and therefore does not convey the actual revenue that can potentially be realized by scheduling or routing thermal energy dispatch either directly to the power block, to TES, or combination of both. Accordingly, there may be times for example during off-peak power demand periods, but when prime solar thermal energy production is at its greatest, where it may be more profitable to store the thermal energy in TES (assuming sufficient capacity remains) rather than routing the energy to the power block to produce electricity when the utility is paying the least for the power produced by the CSP.

In short, the CSP plant controller prior to the present invention has generally used a qualitative heuristic or ad hoc method together with imprecise TOU information to schedule the dispatch of thermal energy and electric power generation rather than applying a more systemic and quantitative approach geared to maximize revenue based on factors such as the solar field collector configuration, weather predictions, storage capacities/limits of the TES, heat exchanger and corresponding CSP system efficiencies in an indirect TES arrangement, and fluctuating hourly, monthly, and seasonal price of electricity paid by the utility to the CSP power generator based on variations in the projected utility customer demand for electricity. Further, when CSP plants are initially designed and built, using TOU projections does not help to design the plant optimally. More often than not, this results in over design (e.g. over-sizing of the TES tanks) thereby increasing initial capital costs and levelized cost of energy (LCOE) prices (i.e. $/kWh).

Figure 2:
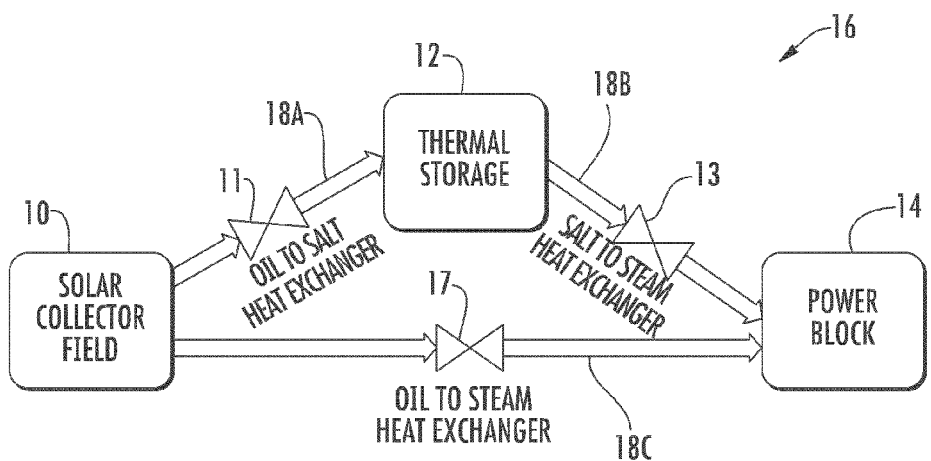
FIG. 2 is a diagram of an indirect thermal energy store (TES) system.

According to one aspect of the present invention, a system and method is provided for optimizing the thermal energy dispatch and power generation of a CSP plant 16 with indirect TES shown in FIG. 2.

Thermal Energy Dispatch System

Figure 3:
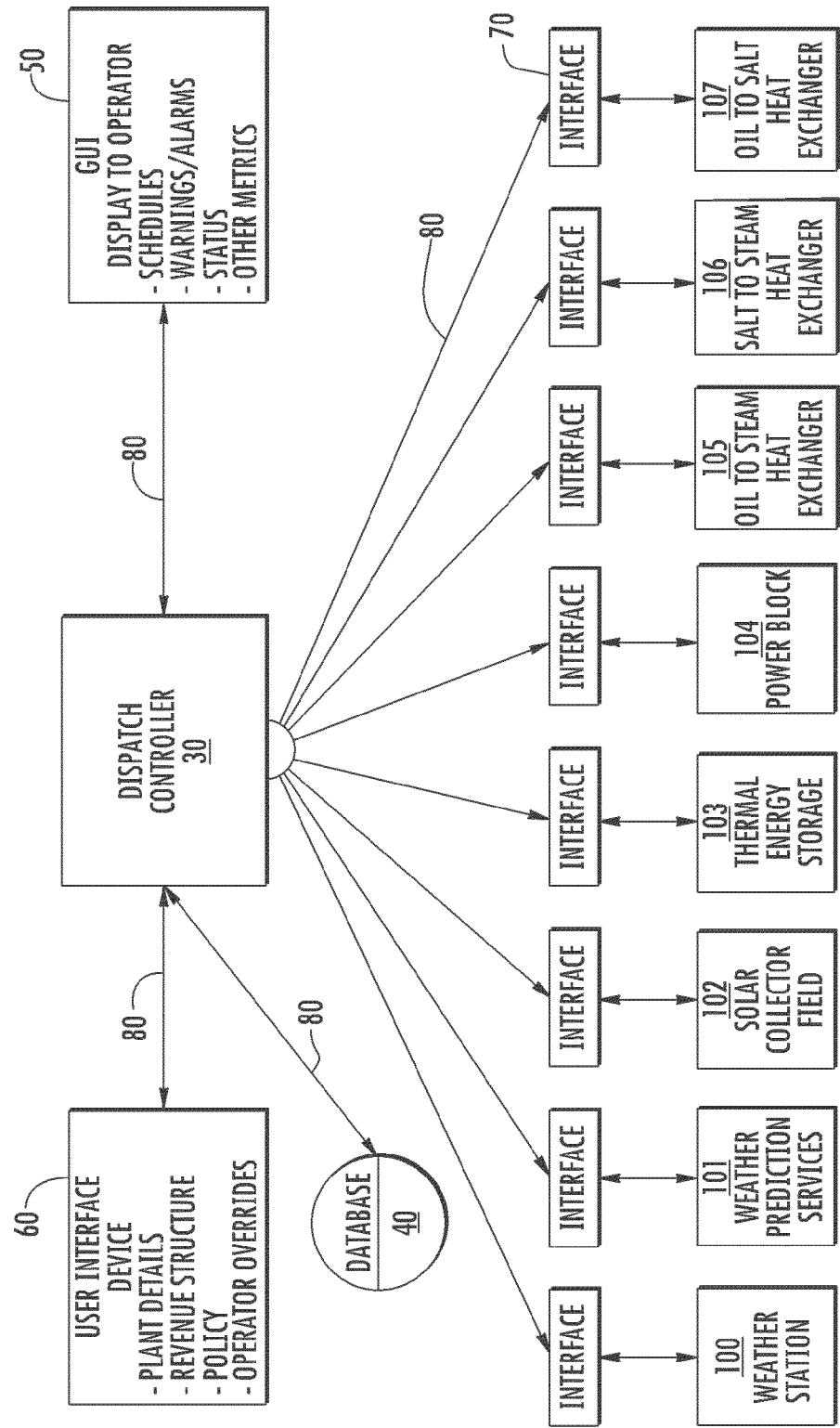
FIG. 3 is a perspective view of one embodiment of a microprocessor-based computer and communication system according to the present invention.

FIG. 3 is a diagram of one embodiment of a thermal energy dispatch system 20 for dispatching thermal energy in a CSP generation plant 16 configured with indirect TES. Dispatch system 20 is a computer-based data processing system and communication network that may include one or more conventional micro-processor based computers and/or servers that are operable to transmit and exchange data to operate the system and optimize the scheduling and routing of thermal energy between the solar collector field 10, thermal storage 12, and/or power block 14 (see FIG. 2). Dispatch system 20 includes a primary thermal energy dispatch computer or controller 30 having suitable memory that acts as a processing hub, associated local or remote database(s) 40 accessible to the controller, a plurality of two-way data communication links 80, and a plurality of two-way communication interfaces 70 interconnecting a multitude of possible subsystems 100-107 all operably linked to the main dispatch controller 30 as shown in FIG. 3. Data communication links 80 may transmit/exchange data, control commands, and signals electronically between the dispatch controller 30 and various subsystems 100-107 which may be local or remote to the dispatch controller and/or the CSP plant. The data communication links 80 may include without limitation conventional wireless, wired, "on-board" (circuit board) conductors, Internet, and combinations thereof.

With continuing reference to FIG. 3, dispatch controller 30 may be a conventional commercially-available computer or networked computers including a central processing unit (CPU) or processor and optionally include ancillary on-board or accessible processors, all of which are pre-programmed with software or computer programs that implement program instructions or control logic routines operable to direct the controller to perform the calculations and data analysis necessary to schedule and direct thermal energy dispatch and power generation in the CSP generating plant and/or control various plant subsystems 100-107 as may be required. It will be appreciated that the program instructions or control logic may be implemented in hardware, firmware, software, or any combination thereof. The program instructions or control logic may be stored and encoded on any suitable commercially available computer readable medium and is readable by dispatch controller 30 for implementation thereby.

The computer readable medium suitable for use with dispatch system 20 may include any type of volatile or non-volatile media such as without limitation computer memory of any type (e.g. any type of RAM, ROM, flash memory, memory cards or chips, etc.) and magnetic, magneto-optical, or optical media, discs, or tapes (e.g. hard disks, CD, DVD, magnetic tape, etc.).

Database 40 may reside on any conventional type of computer readable medium or data storage device that is accessible to dispatch system controller 30.

In some embodiments, with reference to FIGS. 2 and 3, the subsystems 100-107 which interface with dispatch controller 30 via data communication links 80 may include a weather station subsystem 100, weather prediction services subsystem 101, solar collector field subsystem 102 associated with solar collection field 10, TES subsystem 103 associated with thermal storage 12, power block subsystem 104, oil-to-steam heat exchanger subsystem 105 associated with oil-to-steam heat exchanger 17, salt-to-steam heat exchanger subsystem 106 associated with salt-to-steam heat exchanger 13, and oil-to-steam heat exchanger subsystem 107 associated with oil-to-salt heat exchanger 11.

Weather prediction services subsystem 101 may be a remote third-party service such as NOAA (National Oceanic and Atmospheric Administration) having accessible databases with weather-related data useful in making weather forecasts and scheduling thermal energy dispatch for the CSP generating plant. Local weather station subsystem 100 preferably is an on-site weather monitoring system that can measure and provide contemporaneous data on changing local weather conditions.

As further described herein, it will be appreciated that weather or meteorological data is a key data component used in the method described herein to optimize scheduling of thermal energy dispatch/transfer and power generation in a CSP plant with indirect TES. This weather data includes current local weather conditions and weather predictions or forecasts for the coming period as provided from subsystems 100 and 101, respectively. The weather data is useful for determining whether the upcoming period of time will provide sufficient sunlight for the solar collector field to produce thermal energy which may stored in TES and/or supplied directly to the power block for generating power. Accordingly, in some embodiments, dispatch controller 30 or other processors in dispatch system 20 may be programmed to periodically access and download the most current weather data and information from these subsystems 100 and 101 on a periodic basis. In other embodiments, the weather data and information may be monitored and downloaded to dispatch system 20 on a substantially continuous basis. This weather data may be stored in database 40 or elsewhere in dispatch system 20 such as in dispatch controller 30 and retrieved by the dispatch controller to perform the thermal energy dispatch and power generation schedule optimization.

With continuing reference to FIG. 3, dispatch system 20 includes a user interface device 60 and an associated graphical user interface (GUI) 50. In some embodiments, interface device 60 and GUI 50 may be a conventional computer terminal with graphic display or monitor that allows a user or plant operator to upload and download data and control commands to/from the dispatch controller 30. This data may include programmable control logic and software used to control operation and dispatch of thermal energy in the CSP generating plant. The user interface device 60 and GUI 50 in some possible embodiments may be a desktop PC, laptop, notebook computer, PDA, Blackberry, cellular telephone or other suitable system access device that allows the user to program and alter operation of the CSP plant either locally or from a remote location via wired or wireless data communication links 80.

It is well within the ambit of those skilled in the art to determine suitable types of processor and speeds, hard disk storage, memory, power supply, and other typical ancillary equipment and performance requirements needed for the computer-based thermal energy dispatch system 20 described herein depending on the specific application requirements at hand.

Thermal Energy Dispatch and Power Generating Schedule Optimization

One embodiment of a computer-implemented method for optimizing the thermal energy dispatch and generating hour scheduling in CSP power generating plants with TES will now be described. In one embodiment, the CSP generating plant used indirect TES. Preferably, the method advantageously combines and iteratively performs both direct and indirect based TES operating simulations and analyses. In general, a preliminary or initial thermal energy dispatch schedule and sequence is first developed, and then further refined through iteratively performing direct and indirect TES simulations to generate a final thermal energy dispatch schedule that optimizes both thermal energy utilization in the CSP plant with indirect TES and maximizes generating revenue. The final dispatch schedule is programmed into a control system to direct the operation of the TES and generating plant. According to the programmed dispatch schedule, the control system automatically regulates the flow of thermal energy in the TES generating plant by opening/closing flow conduits via valving or similar to route thermal energy from the solar collector field to either TES and/or the power block, and from TES to the power block in some situations. In a preferred embodiment, the control system is a computer processor based control system such as dispatch controller 30 described herein the method that automatically executes the thermal energy dispatch schedule.

Figure 5:
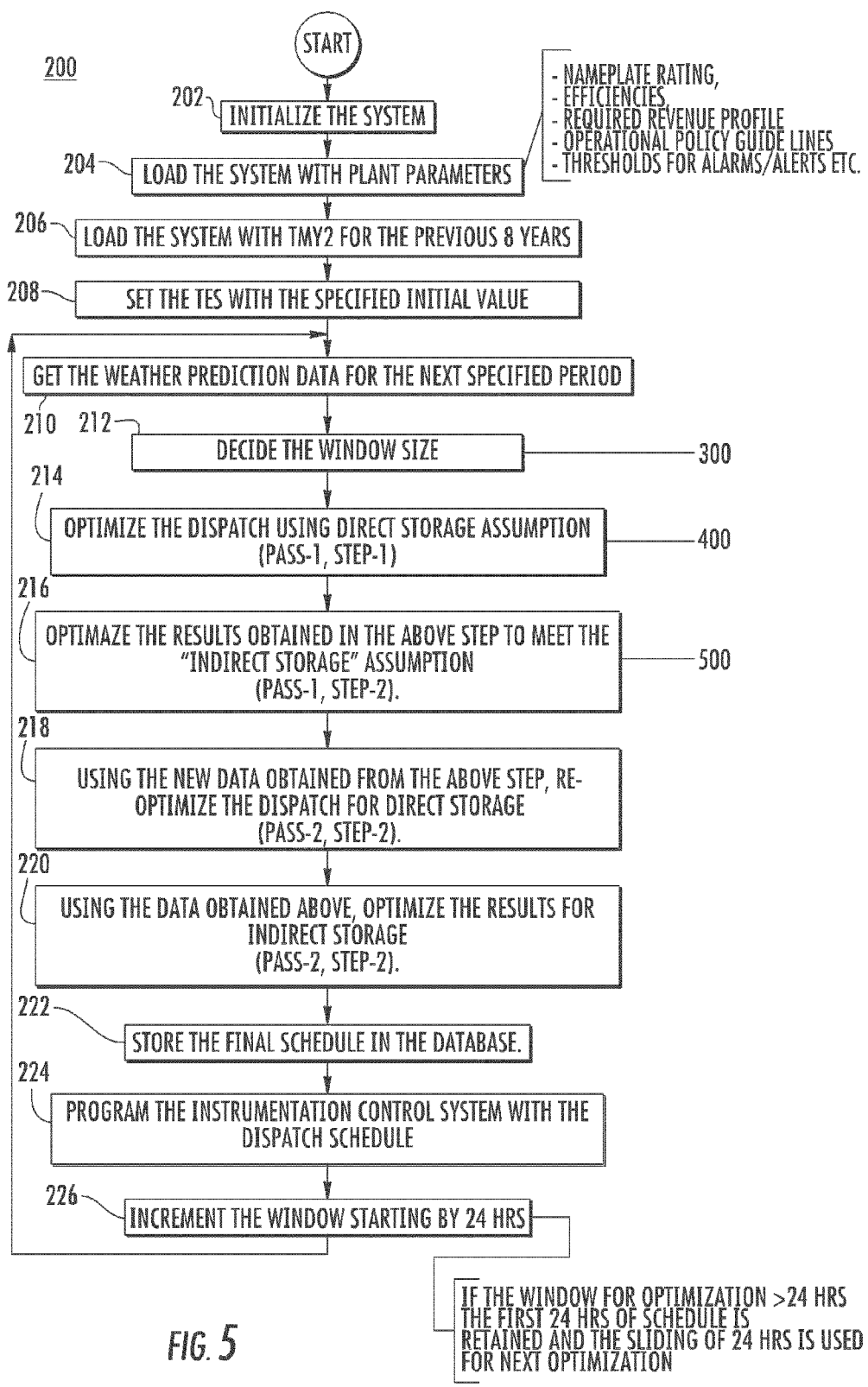
FIG. 5 is a flowchart showing an exemplary program instruction/control logic routine implemented by a computer processor for dispatching thermal energy in a TES generating plant according to one embodiment of the present invention.

Reference is made to FIGS. 1-3, 5, and 10. Referring now to FIG. 5, which shows the main control logic process or routine 200 executed by dispatch controller 30, the thermal energy dispatch and scheduling optimization method preferably may include the steps that follow below. These steps represent programmable control logic or routine instruction steps that are pre-programmed into and executed by dispatch controller 30. The control logic instruction steps may be stored in suitable computer readable medium or memory operably associated with and accessible to controller 30.

The thermal energy dispatch and scheduling optimization method begins with reference to FIG. 5 and the following control logic steps in routine 200:

Initialize and reset the dispatch system 20 including dispatch controller 30 to being a new simulation (Step 202).

Load or program the dispatch system 20 with operating information and data required by dispatch controller 30 to execute the applicable data analysis and control logic steps described herein (Step 204). The input operating data preferably includes operational and financial information that may include without limitation: plant design/operating characteristics (e.g., nameplate rating, heat exchanger and other efficiencies, etc.), required revenue profiles (further explained elsewhere herein), initial TES value, operational policy guidelines (e.g. minimum guaranteed electricity production), operator overrides, operational and/or financial limits, local actual weather data from weather station subsystem 100, weather predictions for the coming operating window or period from weather prediction services 101, and any other information and data that may be relevant to CSP generating plant and analysis for when to dispatch thermal energy and generate electricity. FIG. 13 shows representative operating information and data that may be loaded into dispatch controller 30 in Step 204 for an initial default operating window of 24 hours.

Load or program the system with TMY (Typical Meteorological Year) data for the previous 8 years, in typical meteorological (MET) year data format as will be recognized by those skilled in the art (Step 206).

Set the TES with the specified initial value (Step 208). In the first run through logic routine 200, the initial energy reserve available in TES for use by the Power Block (PB) will be set to zero.

Retrieve the weather prediction data for the next specified period (Step 210).

Calculate and determine the CSP plant operating window size that will be used by the following control logic routine steps for optimizing the thermal energy dispatch or transfer schedule and power generation schedule to maximize revenue production for the power generator (Step 212). The operating window size is measured in units of time, such as a period of hours in some embodiments. The determination of the appropriate operating window size to use preferably is based on data such as without limitation weather predictions for the upcoming operating period, revenue profiles, and operating policies. An initial default window size of 24 hours may be used which follows the diurnal cycle; however, the window size is automatically adjusted to a longer period of time by the dispatch system 20 in some embodiments based data such as weather data and revenue profiles as further described herein.

The operating window sizing programmable control logic routine 300 executed by dispatch controller 30 will be described in more detail below with reference to FIG. 6 after fully describing the thermal energy dispatch and power generating schedule optimization process.

Pass-1, Step-1 Optimization

Figure 7:
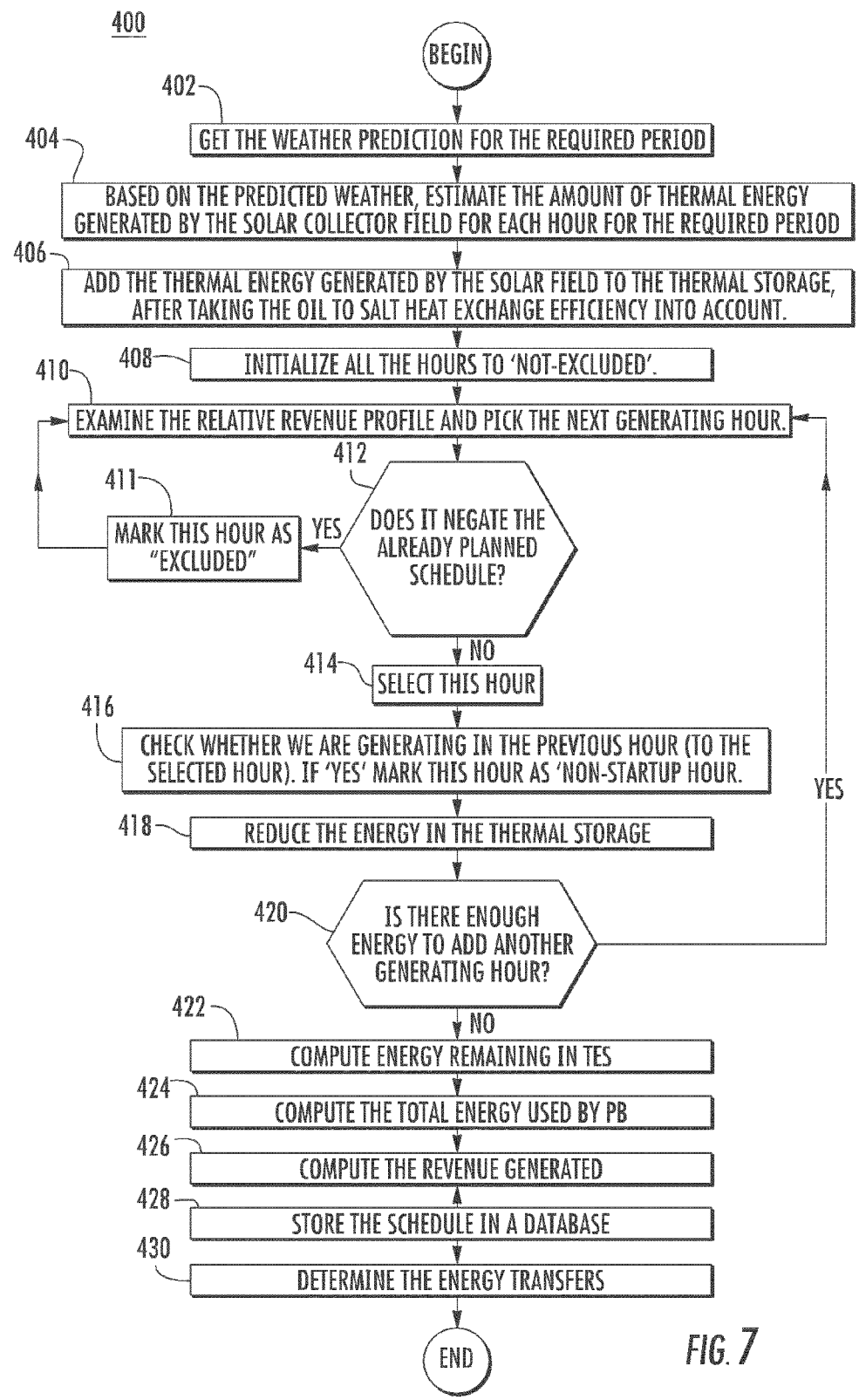
FIG. 7 is a flowchart showing an exemplary program instruction/control logic implemented by a computer processor for performing a direct TES simulation for dispatching thermal energy in a TES generating plant.

Next, in main control logic Step 214 shown in FIG. 5, the thermal energy dispatch is optimized using a Direct Storage assumption and simulation (Pass-1, Step-1). The Pass-1, Step 1 optimization control logic routine 400 will now be further described with reference to FIG. 7 and Steps 402-430 shown therein, and includes:

Retrieve and load the weather prediction for the required period (e.g. from subsystem 101) into dispatch controller 30 (Step 402).

Based on the predicted weather, estimate the amount of thermal energy expected to be generated by the Solar Collector Field for each hour for the required optimization window period of time that has preferably been pre-set in dispatch controller 30 (Step 404).

Add the thermal energy generated by the solar field to the thermal storage, preferably after taking the oil-to-salt heat exchanger efficiency into account (Step 406).

Initialize all the hours to "Not-Excluded" for power generation (Step 408).

Examine the relative revenue profile (explained elsewhere herein) pre-loaded into dispatch system 20 and select or pick the next generating hour (Step 410). The next generating hour is defined herein as the hour for which there is sufficient energy available in TES for operating the power block that will provide maximum revenue and will not affect an already planned generating hour in the dispatch schedule.

Determine if that selected generating hour in Step 412 negates the already planned TES dispatch and generating schedule.

If "YES" is returned in Step 410, then mark that selected hour as "Excluded for this cycle" and continue the search for next best generating hour (Step 411).

If "NO" is returned in Step 412, then select this selected hour (Step 414).

Next, determine or check whether electric power is being generated in the previous hour to the selected hour (Step 416). If "YES" is returned in Step 416, then mark this selected hour as a "non-startup hour." If a "NO" is returned, then mark this selected hour as a "startup hour." In this context, "startup hour" means that the power block (PB) was cold (i.e. offline) and therefore consumes more energy during startup until the PB is ramped up to and reaches normal optimum turbine-generator set operating temperatures and pressures for generating electricity than a "normal or non-startup hour" wherein the PB is already operating at normal operating conditions. Accordingly, the efficiency of the PB (i.e. turbine-generator set) is greater at normal operating temperatures than during the ramp up period from cold start. Whether the selected hour is a startup or non-startup hour sets the amount of energy the PB requires during that hour from the SF and/or TES, with a startup hour requiring more energy.

Next, in Step 418, reduce the amount of thermal energy in TES (after taking into account the salt-to-steam exchange efficiency) by the amount of energy needed for the power block to generate the required electric power.

Next, determine if there is enough thermal energy in TES to add another generating hour (Step 420). If "YES," then repeat above Steps 410 through 418 [7.e through 7.i]. Steps 410-418 are repeated until another generating hour cannot be added (i.e. a "NO" is returned in Step 420 which indicates that there is not enough thermal energy in TES to add another full generating hour).

After a "NO" has been returned in prior Step 420, compute the energy remaining in TES at the end of the optimization period (Step 422). This will be the starting value used for TES for the next optimizing period.

Next, compute the total energy used by PB (Step 424).

Compute the total electricity generated by the PB and compute the corresponding revenue generated (Step 426).

Store the schedule in database 40 or elsewhere for further processing, records, and later audits (Step 428).

Determine the energy transfers from Solar Field to TES and TES to PB (Step 430).

This completes and ends the optimization routine 400 for Direct Storage (Pass-1, Step-1) corresponding to Main control logic Step 214 in FIG. 5.

Pass-1, Step-2 Optimization

With reference now to Step 216 shown in main control logic routine 200 in FIG. 5, the resulting data and schedule obtained in the above Direct Storage optimization control logic routine 400 (Pass-1, Step-1) are next optimized to meet the "Indirect Storage" assumption (Pass-1, Step-2). Step 216 thus provides an additional fine-tuning or refinement of results obtained in control logic routine 400 by now updating the thermal energy dispatch and power generating schedule assuming indirect thermal energy storage.

The Pass-1, Step-2 optimization control logic routine 500 will now be further described with reference to FIG. 8 and Steps 502 though 522 shown therein. In general, each generating hour determined and analyzed in the thermal energy dispatch and generating schedule from foregoing control logic routine 400 (Pass-1, Step 1) is now examined to determine whether there is any energy generated by the solar field (SF) during each hour. In contrast to direct TES, thermal energy generated by the solar field in an indirect TES CSP generating plant may be either dispatched directly to the power block (PB) and/or to TES for later use.

Figure 8:
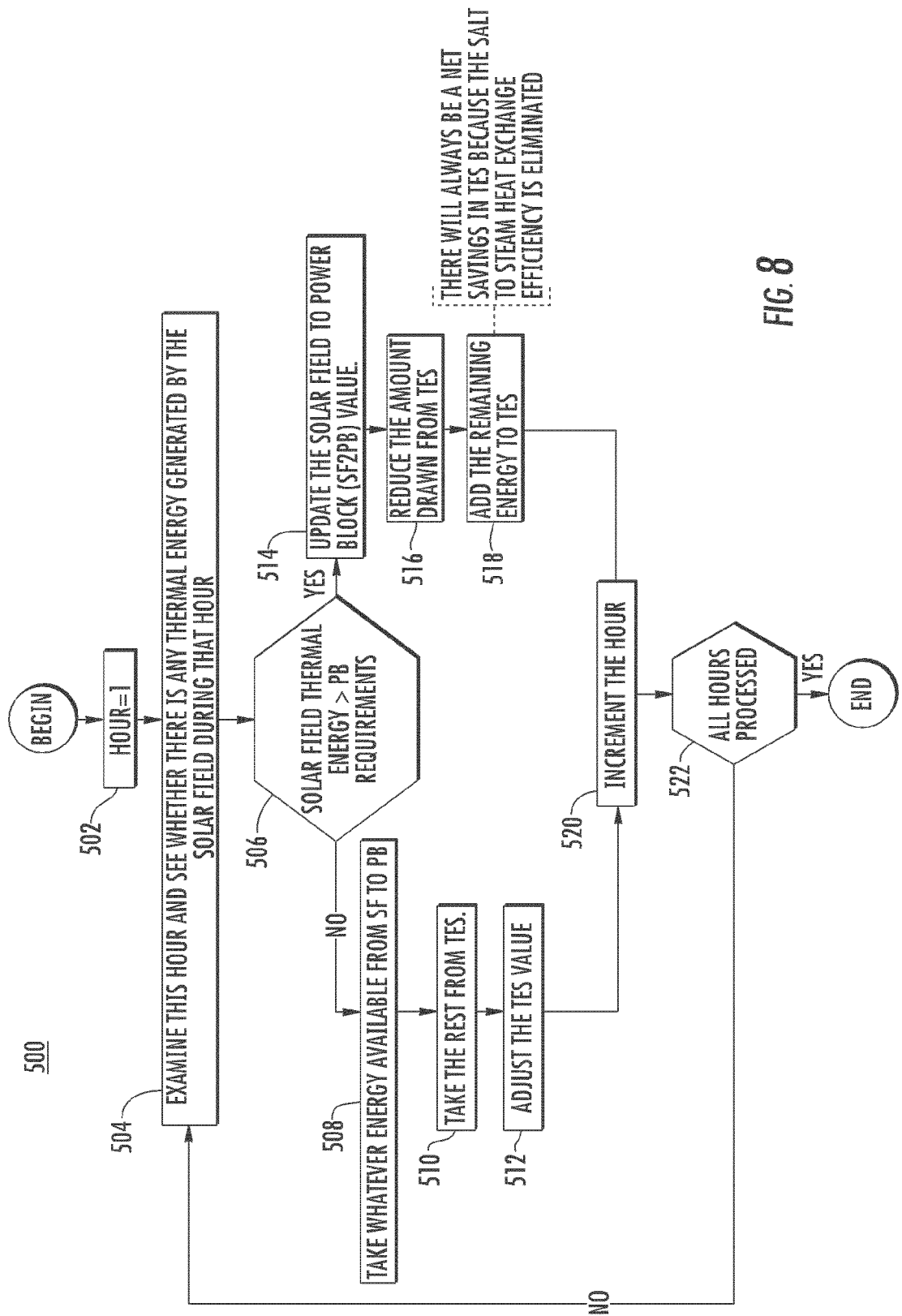
FIG. 8 is a flowchart showing an exemplary program instruction/control logic implemented by a computer processor for performing an indirect TES simulation for dispatching thermal energy in a TES generating plant.

Referring to FIG. 8, routine 500 begins with Step 502 by setting and selecting the first thermal energy dispatch and generating schedule hour (e.g. hour=1) from Pass-1, Step-1 (Step 214 in FIG. 5).

Examine this first generating hour and determine whether there is any thermal energy generated by the solar field during this generating hour (Step 504).

If a "YES" is returned wherein the thermal energy available from the Solar Field is greater than the PB requirements (after taking the oil-to-steam heat exchange efficiency into account) then the following steps are executed by dispatch controller 30:

Update the Solar Field to Power Block (SF-to-PB) value to draw the full amount of thermal energy required by the PB directly from the Solar Field (Step 514);

Reduce the amount drawn from TES (i.e. TES to Power Block PB) by an equivalent amount because the PB thermal energy requirements are being supplied directly from the Solar Field so no TES reserves are required to generate electricity (Step 516); and Add any excess or remaining thermal energy produced by the Solar Field (i.e. thermal energy not required by the PB to generate power) to TES (Step 518). It should be noted that there will generally always be a net savings in TES because the salt-to-steam heat exchanger efficiency involved with drawing thermal energy from TES to the PB is eliminated (i.e., all the thermal energy required by the PB comes directly from SF to the PB).

Alternatively, if a "NO" is returned in Step 506 wherein the Solar Field to TES (SF-to-TE) is less than the PB requirements for generating electric power for that first generating hour being analyzed, then the following steps are executed by dispatch controller 30:

Route whatever thermal energy is available from the SF directly to the PB (Step 508);

Withdraw the rest of the PB thermal energy requirements (i.e. the difference or shortfall in thermal energy that cannot be provided directly from the SF during that first hour) from TES reserves and route the withdrawn thermal energy to the PB (Step 510); and Adjust (i.e. decrease) the TES value of thermal energy reserves to reflect the corresponding reduction in the available TES by an amount equivalent to the thermal energy withdrawn in Step 510 and routed to the PB (Step 512). It should be noted that this would result in a net savings because a part of the energy transfer is directly between SF and PB (i.e. it does not involve TES-to-PB salt-to-steam heat exchanger efficiency).

Next, in Step 520, the first generating hour analyzed is incremented and accounted for whether the result of the decision in Step 506 was "YES" or "NO". Then, in Step 522, the control logic routine 500 determines if all the generating hours from the Direct Storage control logic routine 400 have been analyzed under the Step-1, Pass-2 Indirect Storage assumption. If "NO" is returned, Step 506 is repeated again until all generating hours in the schedule have been analyzed under routine 500. If "YES" is returned, routine 500 of Step-1, Pass-2 is terminated.

It should be noted that in the end of the foregoing indirect TES optimization in routine 500 (Step-1, Pass-2), the TES will have more energy remaining or reserves when compared to the direct TES optimization (e.g. Steps 1-7) because thermal energy to the PB flows both directly from the Solar Field and from TES to meet the full thermal energy requirements of the PB (i.e. dual thermal energy feeds to the PB as shown in FIG. 2). It is interesting to note that the maximum capacity of thermal storage 12 needed for indirect TES will be larger than that needed for direct TES because the thermal storage 12 is sized to accumulate excess thermal energy from the Solar Field when not all the energy produced by the Solar Field is needed to satisfy the requirements of the PB.

Pass-2, Step-1 Optimization

Referring back now to main control logic process 200 in FIG. 5, using the resulting new data and dispatch schedule obtained from the above Pass-1, Step-2 Indirect Storage assumption optimization in control logic routine 500, we next re-optimize the dispatch for Direct Storage (Pass-2, Step-1) in Step 218. Initially, it should be noted that there is more thermal energy available in the TES at the end of foregoing Pass-1, Step-2 Indirect Storage optimization (control logic process 500) than the energy remaining in TES in Pass-1, Step-1 Direct Storage optimization (control logic process 400) since part of the PB thermal energy requirements are satisfied directly from the Solar Field in Indirect Storage.

In the Pass-2, Step-1 (Step 218) optimization now, we try adding more generating hours to the dispatch schedule using the new value of remaining energy in TES calculated due to indirect storage (Pass-1, Step-2; logic process 500). In one embodiment, therefore, the same foregoing "add a generating hour" analysis sequence of Steps 410 through 420 in the Direct Storage control logic routine 400 (Pass-1, Step-1) is now repeated to determine if more generating hours may be added. In most cases, it is expected that more generating hours can be added to the schedule except perhaps in a special case where the generation of electricity using PB does not overlap at all with the thermal energy available from the Solar Field (e.g., all the hours of generation are in the overnight dark hours). The Pass-2, Step-1 optimization advantageously will typically result in higher revenue from the same CSP plant because the thermal energy reserves in thermal storage 12 (see, e.g. FIG. 2) are better utilized.

Pass-2, Step-2 Optimization

Using the resulting data and dispatch schedule obtained above in Pass-2, Step-1, the results for Indirect Storage are next re-optimized (Pass-2, Step-2) in Step 220 of main control logic routine 200 (see FIG. 5) using the following steps:

First, the same foregoing Indirect Storage optimization method described in Pass-1, Step-2 is repeated. Accordingly, in one embodiment, control logic routine 500 including Steps 502 through 522 are run again but this time using the results of the new schedule generated in above Pass-2, Step-1 of Direct Storage. Any remaining thermal energy remaining in TES at the end is marked and used as the starting value in TES for next optimization period for executing main control logic routine 200 again.

At the completion of Pass-2, Step-2, the projected electricity generated and revenue to be produced is computed.

Returning now again to FIG. 5, at the completion of Pass-2, Step-1, main control logic process 200 continues in Step 222 in which the final optimized thermal energy dispatch and CSP plant generating schedule is stored in dispatch controller 30 and its associated memory and/or database 40. In step 224, the dispatch controller 30 is programmed with the final thermal energy dispatch and generation schedule. In step 226, the operating window size is incremented and set to the window determined in control logic routine 300 shown in FIG. 6 and described immediately below. In one embodiment, the operating window size may be at least 24 hours which may represent a default operating window size that follows the diurnal cycle. In some embodiments, the operating window size may be greater than 24 hours. In such cases, the first 24 hours of the dispatch schedule may be retained and a sliding 24 hours is used for the next optimization.

According to the sequencing and timing developed in the final thermal energy dispatch schedule programmed into dispatch controller 30, the controller will open/close flow conduits 18A-C via valving and start/stop various pumps associated with solar collector field 10 and thermal storage 12 in the thermal energy pumping and piping system as shown in FIG. 2 at predetermined times in a manner which advantageously optimizes thermal energy dispatch in the TES generating plant and maximizes revenue production for the generating plant. Dispatch controller 30 is operative to generate and transmit control signals to the thermal energy pumping and piping system valving and pumps in a conventional manner via suitable data communication links similar to links 80 described herein to effectuate control of that equipment. An exemplary final thermal energy dispatch schedule showing the thermal energy flow control and sequencing through a TES generating plant is further described elsewhere herein with reference to FIGS. 14-16.

Adaptive Optimization Window of Time

According to another aspect of the invention, a method is provided for creating an adaptive optimization window or period of time that is used in the thermal energy dispatch and power generation scheduling method in main control logic process 200 described above. The optimization window preferably adapts to both changing weather conditions and changing revenue profiles to generate an overall operating schedule (i.e. both thermal energy dispatch and power generation) for a CSP plant with indirect TES over a variable period of time that maximizes power generation revenue. In some embodiments, the optimization window may be extended to maximize power sale revenues for the CSP plant.

Due to the nature of solar power generation using CSP, the initial optimization window size defaults to diurnal cycle. Hence, the dispatch system 20 preferably uses an initial default optimization window size of 24 hours for calculating the schedule used to control the thermal energy dispatch or transfer and electric power generation (i.e. operation of the turbine-generator set in the power block 14).

Figure 6:
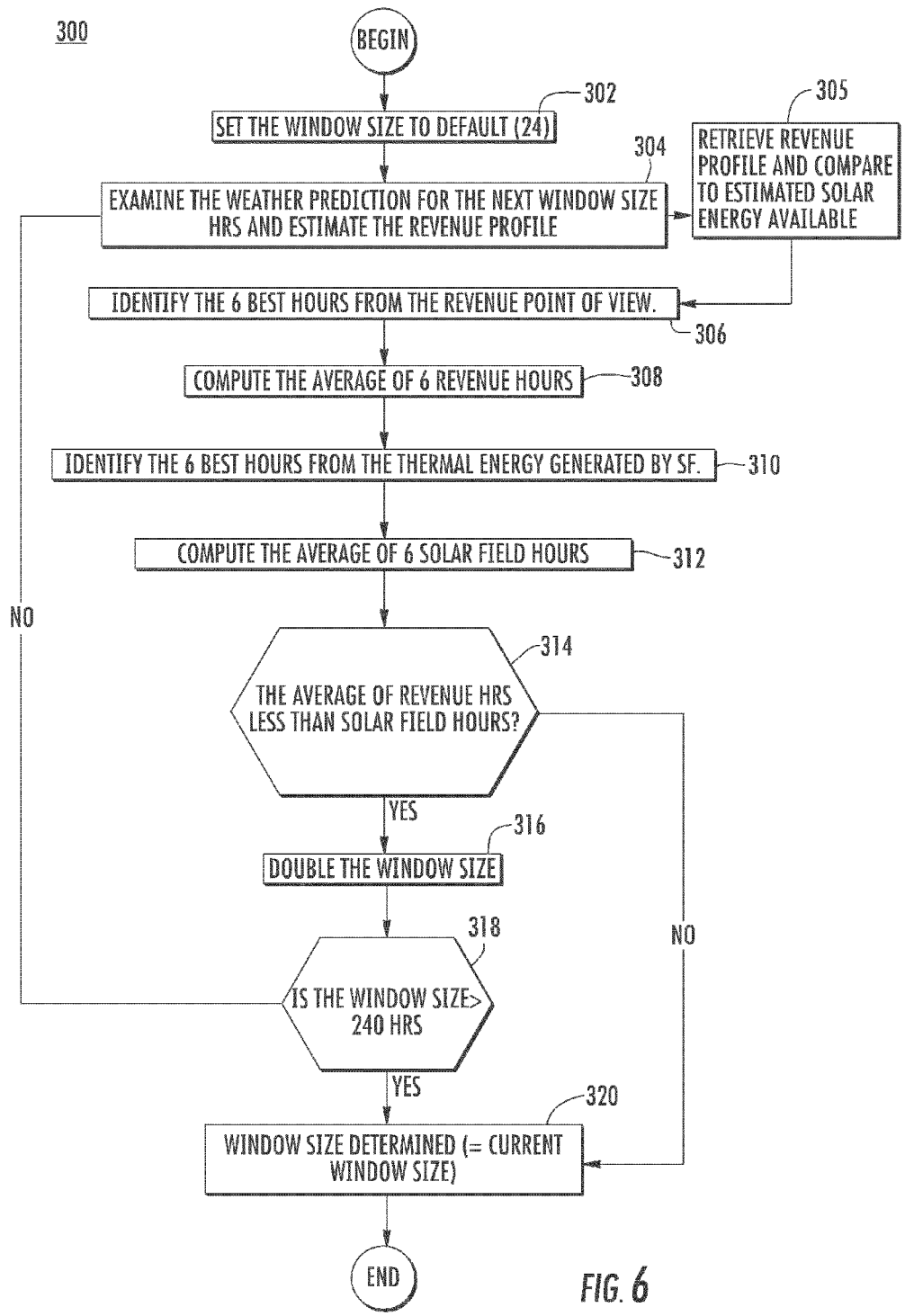
FIG. 6 is a flowchart showing an exemplary program instruction/control logic implemented by a computer processor for determining an optimum operating window size for a TES generating plant usable in the routine of FIG. 5.

Referring to FIGS. 3 and 6, one embodiment of a method for creating an adaptive optimization window is shown in control logic routine 300 that may be executed by the dispatch controller 30. Logic routine 300 may include some or preferably all of the follow steps:

In Step 302, set the initial optimization window to a default period of 24 hours.

Next, in Step 304, the weather prediction data downloaded into dispatch system 20 for the upcoming next 24 hour initial default period, such as from weather prediction services subsystem 101 for example, is accessed and retrieved by dispatch controller 30. This data may be stored in memory, database 40 or elsewhere in the system and retrieved by dispatch controller 30. From the weather prediction data, the amount of thermal energy that would be available from the solar collector field (SF) for power generation based on anticipated weather conditions during the 24 hours period is estimated and analyzed.

In Step 305, access and retrieve the relevant revenue profile pre-programmed into dispatch system 20 for the pertinent day, month, and 24 hour period or window being analyzed and compare the revenue profile to the solar energy available from the SF during the period or window in question.

In Step 306, determine the "X" best revenue hours of the 24-hour window from a maximum revenue standpoint, wherein X=a representative total number of predetermined individual revenue hours during the initial default window selected for conducting the optimization analysis and which are pre-programmed into dispatch controller 30. In one preferred embodiment, a total of 6 hours (i.e. X=6) may be selected for the "X" best revenue hours for example.

Next, in Step 308, compute the average of the 6 best revenue hours ("X-average"). For example, the 6 best revenue hours may fall on Hours 6, 7, 8, 9, 10, 11, and 12 during the 24 hour initial window being analyzed, which coincides with the hours during which the electric utility is willing to pay the most for each MWe of electricity generated by the CSP generating plant. The average of these hours calculated by dispatch controller 30 is therefore Hour 10.5, which represents an average hour during the initial default window when revenues would be at a maximum.

In Step 310, determine the "Y" best solar field (SF) thermal energy production hours from a maximum solar energy available standpoint, wherein Y=a representative total number of predetermined individual solar hours during the default window selected for conducting the optimization analysis and which pre-programmed into dispatch controller 30. Preferably, "Y" should equal "X" to provide a consistent basis for comparing maximum revenue hours and solar thermal energy production hours as further described below. Continuing with the foregoing exemplary case where X=6 hours as described above, Y=6 best solar field hours in this embodiment.

Next, in Step 312, dispatch controller 30 computes the average thermal energy available during the 6 best solar field thermal energy production hours ("Y-average"). Continuing with the foregoing example, the 6 best solar production hours may be Hours 12, 13, 14, 15, 16, 17, and 18. The average of these hours is therefore Hour 17.5, which represents an average hour during the initial default window when solar energy production would be at a maximum.

It will be appreciated that either the "X" or "Y" best revenue and solar production hours, respectively need not, and often will not be purely consecutive hours as shown in the foregoing examples due to variability in daily and weekly revenue profiles and available of the sun to produce thermal energy.

Then, in Step 314, a test is performed to compare and determine if the average revenue hours ("X average") are less than the average solar field hours ("Y average") from Steps 310 and 312, respectively. CSP generating plants with TES have the ability to capture and store thermal energy during one period of time based on solar availability, and then later use the stored energy during a subsequent or later period of time when it may be financially more advantageous to use the thermal energy to generate and sell electricity to the utility company as explained herein. Based on this premise and to take full advantage of TES, Step 314 is therefore intended to generate a optimum thermal energy dispatch window of time in which the average peak hours that solar energy is available from the sun to produce thermal energy (based on the sun shining due to good weather conditions and time of day) occurs before the thermal energy is needed to meet the utility's peak power demand period which coincides with the maximum or best revenue production hours (i.e. when the utility is willing to pay most for electricity generated by the CSP plant based on the TOD relative energy value factors described herein). Ideally, therefore, the maximum solar and thermal energy production hours during the initial default window selected for analysis preferably should not occur after the hours when the power demand is the greatest.

Accordingly, with continuing reference to Step 314, if the average of the revenue hours (X average) is equal to or greater than Solar Field hours (i.e. a "NO" response is returned to the test), control passes to Step 320 in which the optimization window size is set to the current window size under analysis. This window size is then used by main control logic routine 200 as described herein with reference to FIG. 5, Step 212. In this case, the "NO" response in Step 314 signals the preferred situation in which thermal energy production peaks before the maximum revenue and power demand period as described above.

If alternatively the average of the revenue hours is less than Solar Field hours (i.e. a "YES" response is returned) in Step 314, then a new larger window size is created in Step 316 because the thermal energy production peaks after the maximum revenue and power demand period during the default window. This means that the solar energy available would not be used to its optimum benefit to produce and store thermal energy for later use to generate power. In one exemplary embodiment, an additional 24 hours is added to the original 24 hour window size being analyzed in Step 316 which therefore is doubled to a new window of 48 hours for further analysis in routine 300. In addition, the number of best revenue hours and thermal energy production hours by the solar field selected in Steps 306 and 310, respectively, may also be doubled to coincide with the new larger 48 hour window being analyzed. In the foregoing example, the number of hours analyzed for the new 48 hours window being analyzed by dispatch controller 30 may therefore be 12 hours in lieu of the 6 hours originally analyzed for the initial default 24 hour window.

Continuing with the foregoing example to illustrate an exemplary test performed in Step 314, Hour 10.5 from Step 308 representing the average of the 6 best revenue hours (X average) would be compared to Hour 17.5 from Step 310 representing the average of the 6 best solar production hours (Y average). In this example, the average revenue hour (i.e. Hour 10.5) is less than the average solar production hour (i.e. Hour 17.5) meaning peak power demand unfortunately occurs before the chance to produce and store thermal energy. Therefore, a "YES" response would be produced in Step 314 in this example and control would pass to Step 316 described above wherein the subsequent window size (e.g. 48 hours in some embodiments) is doubled to re-run the optimization window analysis in hopes of generating a "NO" response in Step 314 during the next pass through control logic routine 300.

In Step 318, logic routine 300 continues and a test is performed to compare the new window size determined in Step 316 to a maximum predetermined window size limit that is input into dispatch controller 30. In one embodiment, for example, the maximum window size may be 240 hours (10 days). However, any suitable operating window size may be used. If the new window size is less than or equal to the new window size limit (i.e. a "NO" response is returned), foregoing Steps 304 through 316 are repeated until the average of the best revenue hours is greater than or equal to the average of solar field hours in the test of Step 314, or the window reaches the limit in Step 318 as already described herein.

Preferably, in one embodiment, if the operating window for optimizing revenue is greater than 24 hours, then the first 24 hours of the generating schedule is retained and the sliding of 24 hours is used for next optimization cycle in control logic routine 300. As an example, if the foregoing thermal energy dispatch window optimization yields an optimum window size of 96 hours and the initial hour of the schedule being analyzed starts at schedule Hour 4001, the thermal energy dispatch schedule will be based on a 96 hour window from Hours 4001 to 4096. The thermal energy dispatch schedule for the first 24 hours of the schedule from Hours 4001 to 4025 is retained by dispatch controller 30 and thermal energy will be dispatched or routed in the CSP generating plant accordingly by dispatch controller 30. The next optimization analysis performed by control logic routine 300 will start at Hour 4025 and proceed as described above starting with an analysis for the next 24 hour period from Hour 4025-4048.

It should be noted that some utility companies pay more for the power generated in the early morning hours since that is a peak electric consumption period for utility customers. Some utilities even mandate that the CSP generating plant produce and sell electricity during these morning hours, even though due to weather conditions this may not be the most efficient or profitable time for the CSP generator to generate power with indirect TES if the solar field cannot directly provide at least some of the thermal energy required by the power block.

Advantageously, the proposed adaptive window selection method will handle these cases in a natural way by factoring the weather conditions and maximum revenue generating profiles into the modeling and adapting the window to a longer period of time than the next 24-hour period during which time inclement weather may be experienced.

Revenue Profiles

Revenue profile data, which is retrieved and processed by the present foregoing method and transformed into actual schedules for operating and controlling thermal energy dispatch and electric generation in the CSP plant, represents the relative hourly, daily, monthly, and seasonal fluctuating prices (e.g. $/kWh) that the electric utility is willing to pay the CSP power generator for electricity based on the historical fluctuation in electric demands of the utility's customers. Agreements between independent CSP power generators and utilities stipulate and generally guarantee what revenue the utility can expect to receive from the utility for power sold. This power sale revenue is determined from the product of (1) a base energy rate (also referred to as levelized cost of energy or LCOE) for the CSP plant and (2) a "time of day (TOD) price adjustment factor" that reflects the time-dependent variability in electric demand. An example of representative time of day price adjustment factors is shown in FIG. 9. The days of the month are shown in Row 4 across the top of the chart and the hours of the day are shown in Column A. It should be noted that the base energy rate will be unique for each CSP generating plant and reflects both capital and O&M (operating and maintenance) costs pertinent to that plant.

As seen in FIG. 9, there are times when the CSP generating plant will receive its full base energy rate during normal electric demand periods (i.e. "1.00"), less than the base energy rate during low demand periods (e.g. 0.5 or 0.75 times the rate), or more than the base energy rate during peak demand periods (e.g. 1.25 or 1.5 times the rate). Accordingly, it is more profitable for the CSP generating plant to generate and sell power to the utility during period of normal or peak electric demand, rather than during low demand periods when the CSP plant will sell generate and sell power at a loss (i.e. less than the base energy rate).

Figure 10:
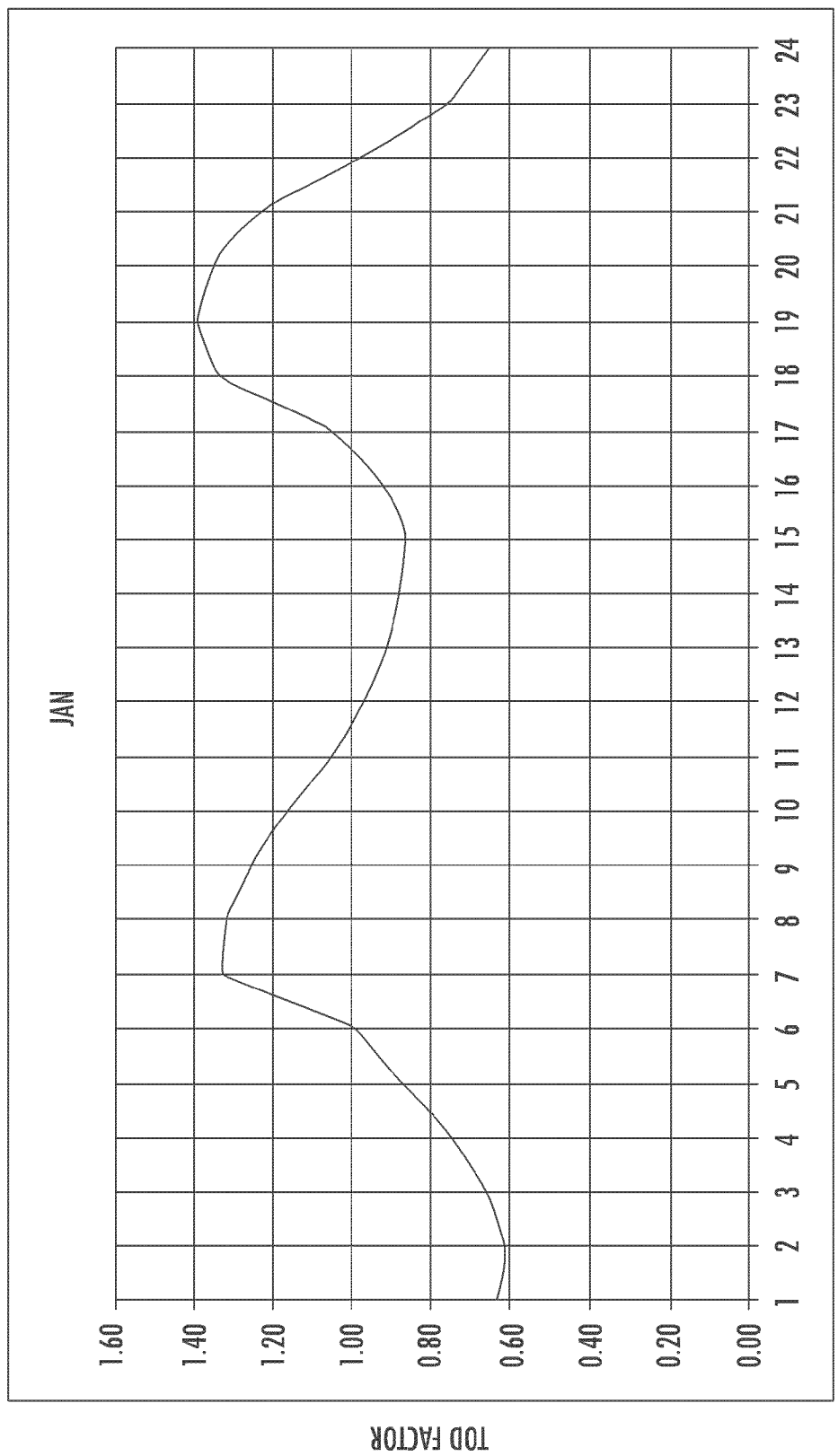
FIG. 10 is a graph showing the variability in average TOD relative energy value factors for a hypothetical month.
Figure 11:
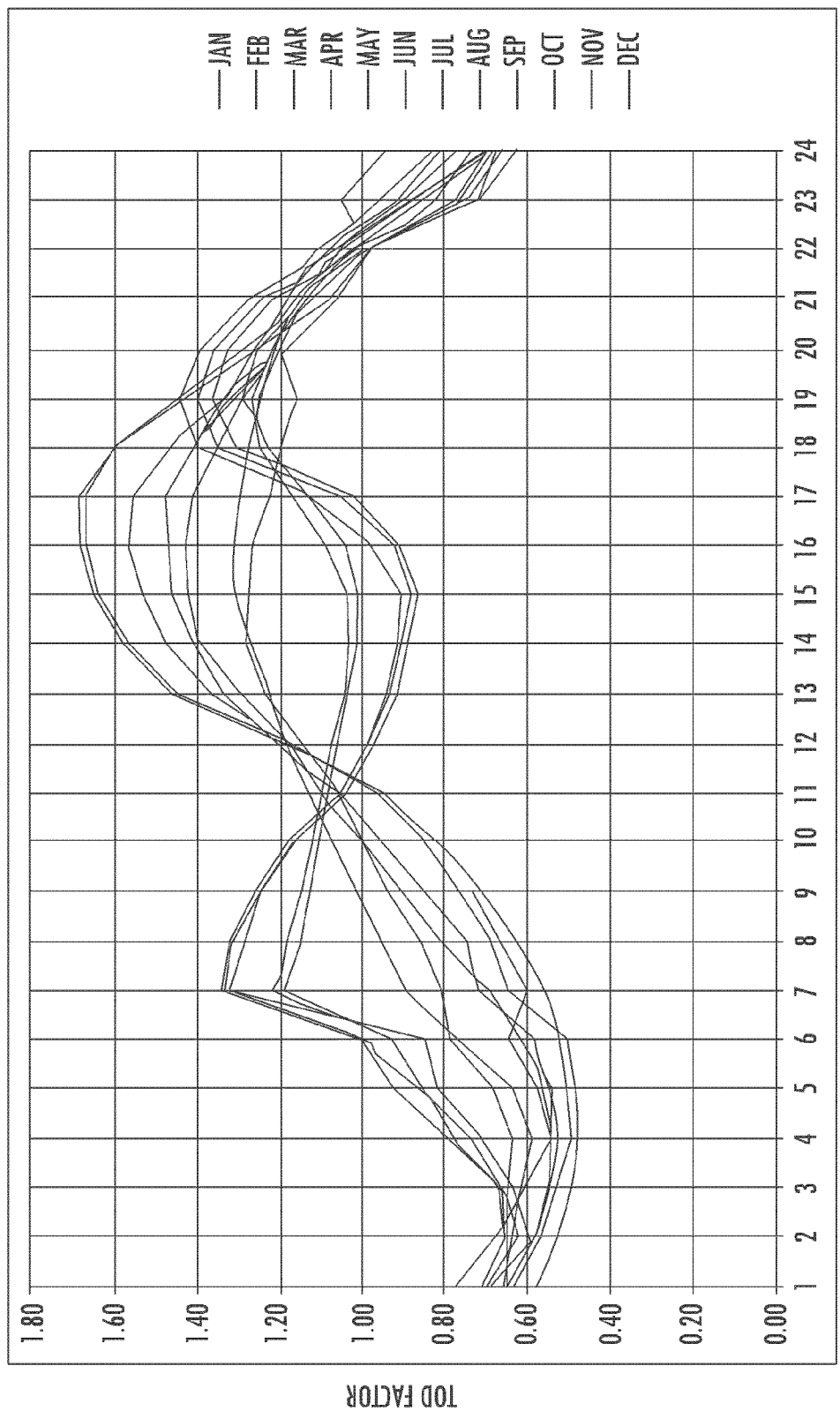
FIG. 11 is a graph showing the variability in average TOD relative energy value factors price adjustment factors for hypothetical year by month.

Examples of a representative monthly and yearly revenue profiles are graphically depicted in FIGS. 10 and 11. FIG. 10 shows a possible average monthly-hourly revenue profile for January which has been averaged for each day over the entire month. The time of day (TOD) factors described herein are shown on the vertical axis and Generating Hours are shown on the horizontal axis. However, it will be appreciated that individual daily-hourly revenue profiles may be generated and used with the hourly variations in revenue for each day of the entire month. FIG. 11 represents a cumulative graph that includes all 12 average monthly-hourly revenue profiles for a given year. The data represented by the graphs or curves in these figures is input and downloaded into dispatch controller 30 for each hour of each day during the analysis period for use in the thermal energy dispatch and power generation optimization processes and control logic routines described herein.

FIG. 12 shows the individual average monthly-hourly revenue data for January through December that is graphically depicted in FIG. 6 in tabular form as pre-programmed and loaded into dispatch controller 30. The days of the month are shown in Row 3 across the top of the chart and the hours of the day are shown in Column A.

The revenue profiles advantageously provides precise predictions of actual revenues that the CSP power generator can expect from selling electricity to the utility over a given period of time, unlike the imprecise relative scales used in past based on TOUs (e.g. numbers on scale of 1 to 10) as described above. Revenue profile data and exemplary profiles that may be used in the method of the present invention are described in more detail herein.

The revenue profile date is pre-programmed into dispatch system 20 and may be stored in database 40 on computer-readable medium or reside elsewhere in the system for later access during the thermal energy dispatch and power generation optimization process. It will be appreciated that using the more detailed and fine tuned revenue profile in lieu of TOU integer data heretofore will allow more precise calculation of expected CSP plant revenues from power sales to facilitate developing the optimum thermal energy dispatch and power generation schedules to maximize revenues. In some instances, such schedules may dictate storing available from the solar collector field 10 in lieu of generating power in the power block 14 (see FIG. 2) during periods of low electric demand, and reclaiming the thermal energy from TES 12 to generate power at a later time during normal or peak periods of electric demand.

FIGS. 14 and 15 show exemplary results in tabular form of the main control logic routine 200 of FIG. 5 for a 24 hour operating window. FIG. 14 shows the results of the first Pass (i.e. Pass-1, Steps 1 Direct TES and 2 Indirect TES). FIG. 15 shows the results of the final second Pass (i.e. Pass-2, Steps 1 Direct TES and 2 Indirect TES), with the bottom chart on FIG. 15 representing the results of the final thermal energy dispatch and power generating schedule for the 24 hours period shown. The system and method according to the present invention advantageously combines both Direct and Indirect TES models and assumptions using multiple passes to fine tune the dispatch/generating schedule and maximize generating revenues.

Figure 16:
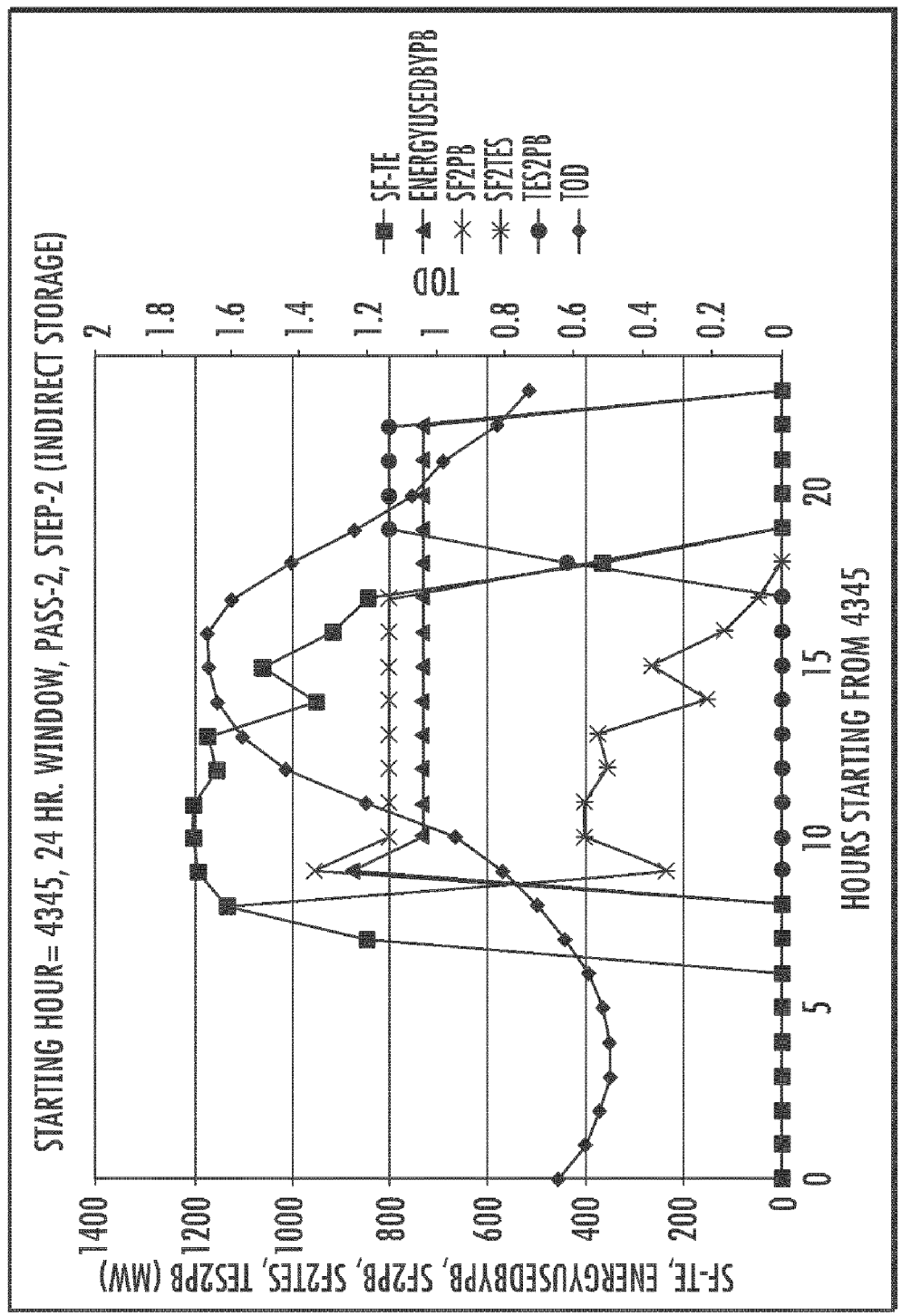
FIG. 16 is a graph showing the exemplary results from the second pass indirect TES simulation of FIG. 15 in graphical form.

FIG. 16 graphically depicts the results of the final 2nd Pass Indirect analysis shown in the bottom table on FIG. 15 (note that in FIG. 15, data point 1 on the horizontal axis=generating Hour 4345 and data point 24=generating Hour 4368). Thermal energy units shown in the left vertical axis are in MWh.

Referring to FIGS. 15 and 16, data point 17 in FIG. 16 corresponding to generating Hour 4361 (index #16) in the bottom chart on FIG. 15 (2nd Pass-Indirect Storage) will be used as an example to illustrate the results from the present thermal energy dispatch and power generation optimization system and process described herein. During Hour 4361, a projected 911 MWh of solar energy will be available and produced by the solar collector field (SF-TE). The amount of energy required and used by the Power Block (PB) to generate rate turbine-generator set nameplate capacity 290 MWe (megawatts of electricity) is 732 MWh. To compensate for the oil-to-steam heat exchanger efficiency, which may be for example 92% resulting in some heat energy loss' in the heat exchanger, the SF to PB energy required is actually higher or 796 MWh (SF2PB) to deliver the 732 MWh of energy needed by the PB. Since there is more thermal energy available from the SF than required by the PB during this generating Hour, the PB energy requirements can be met completely by the SF without extracting thermal energy reserves from TES. Accordingly, TES to PB energy draw (TES2PB) is zero during generating Hour 4361 (data point 17 in FIG. 16). Furthermore, the SF is producing more thermal energy than required by the PB. Therefore, the excess thermal energy of 115 MWh (911 MWh available–796 MWh required by PB) may be stored in and added to the TES reserve for later use during a future generating hour.

It also bears noting in the foregoing example from FIGS. 15 and 16 that generating Hour 4361 is a peak power demand period for the electric utility as indicated by the TOD=1.67% (1223 TOD-scaled). Therefore, the CSP generating plant will receive 1.67 times the full base energy rate that the electric utility is obligated to pay the generator. Accordingly, it is more profitable for the CSP generating plant to generate and sell power to the utility during this period than other times (see, e.g. Hours 4345-4351 in FIG. 15 bottom and TOD-scaled graph in FIG. 16 when the TOD is less than 0.60).

As shown in FIG. 15 (2nd Pass-Indirect Storage chart) and FIG. 16, for an exemplary 24 hour generating period, the Power Block is only operated during Hours 4355 through 4367 which represents thermal energy dispatch and power generation schedule that maximizes revenue to the CSP generating plant owners by managing and optimizing the thermal energy flow in the plant from the solar collector field to the PB and/or TES. Generating power during the remaining hourly periods would not be cost effective from a revenue standpoint. It is also notable that as a result of the two-pass optimization process described herein, management of the thermal energy dispatch or flow and generating schedule allowed an additional hour of generation to be added when comparing the tables in FIGS. 15 and 16 (noting that generating Hour 4354 was added from the first pass to the second pass).

While the foregoing description and drawings represent the preferred embodiments of the present invention, it will be understood that various additions, modifications and substitutions may be made therein without departing from the spirit and scope of the present invention as defined in the accompanying claims. In particular, it will be clear to those skilled in the art that the present invention may be embodied in other specific forms, structures, arrangements, proportions, sizes, and with other elements, materials, and components, without departing from the spirit or essential characteristics thereof. One skilled in the art will appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

What is claimed is:

1. A system for dispatching thermal energy in a solar power generating plant with thermal energy storage, comprising:
 a solar power generating plant comprising a solar collector field, thermal energy storage, and a power block operative to generate electricity;
 a dispatch controller comprising a computer processor and computer readable medium accessible to the processor;
 control logic stored on the computer readable medium and implemented by the processor, the processor when implementing the control logic being operative to generate an optimized thermal energy dispatch schedule which controls operation of the generating plant by performing a combination of direct thermal energy storage and indirect thermal energy storage simulations, the processor implementing the dispatch schedule and controlling flow of thermal energy through the generating plant in accordance with the dispatch schedule.

2. The system of claim 1, wherein the flow of thermal energy through the generating plant is controlled by the processor automatically performing at least one of a function selected from the group consisting of opening a thermal energy flow conduit, closing a thermal energy flow conduit, starting a thermal energy flow pump, and stopping a thermal energy flow pump.

3. The system of claim 1, wherein the processor is further operative to:
 retrieve operating data for the generating plant;
 generate a first thermal energy dispatch schedule by analyzing the operating data using a direct thermal energy storage simulation;
 generate a second thermal energy dispatch schedule by analyzing results from the first thermal energy dispatch schedule using an indirect thermal energy storage simulation;
 modify the first thermal energy dispatch schedule by analyzing results from the second thermal energy dispatch schedule using the direct thermal energy storage simulation to generate a modified first thermal energy dispatch schedule;
 modify the second thermal energy dispatch schedule by analyzing results from the modified first thermal energy dispatch schedule using the indirect thermal energy storage simulation to generate a final second thermal energy dispatch schedule; and
 control the dispatch of thermal energy in the generating plant according to the final second thermal energy dispatch schedule.

4. The system of claim 1, wherein the processor uses weather forecasts and financial data relative to an identified operating window period of time to perform the simulations.

5. The system of claim 1, wherein the flow of thermal energy is characterized by the flow of a heat transfer fluid through the generating plant.

6. The system of claim 5, wherein the processor is further operative to route the flow of the heat transfer fluid from the solar collector field to at least one of the thermal energy storage or the power block.

7. The system of claim 1, wherein the processor is further operative to determine an optimum operating window for the generating plant by examining weather prediction data and revenue profile data.

8. The system of claim 1, wherein the indirect thermal energy simulation includes the processor determining if any thermal energy available from the solar collector field is greater than thermal energy requirements of the power block for a preselected period of time and at least one of either drawing thermal energy from the thermal energy storage to the power block or drawing thermal energy from the solar collector field for the period of time.

9. The system of claim 1, wherein the direct thermal energy storage simulation includes the processor selecting a plurality of generating hours ranked by most profitable to least profitable hour based on the relative revenue values for every generating hour in which there is sufficient thermal energy in thermal storage to operate the power block.

\* \* \* \* \*